United States Patent
Lietzau et al.

(10) Patent No.: US 8,163,200 B2
(45) Date of Patent: *Apr. 24, 2012

(54) CYCLOHEXENE COMPOUNDS FOR LIQUID-CRYSTALLINE MIXTURES

(75) Inventors: Lars Lietzau, Darmstadt (DE); Markus Czanta, Darmstadt (DE); Atsutaka Manabe, Bensheim (DE); Kai Jaehrling, Lautertal (DE)

(73) Assignee: Merck Patent Gesellschaft MIT Beschraenkter Haftung, Darmstadt (DE)

( * ) Notice: Subject to any disclaimer, the term of this patent is extended or adjusted under 35 U.S.C. 154(b) by 234 days.

This patent is subject to a terminal disclaimer.

(21) Appl. No.: 12/377,424

(22) PCT Filed: Jul. 18, 2007

(86) PCT No.: PCT/EP2007/006382
§ 371 (c)(1),
(2), (4) Date: Feb. 13, 2009

(87) PCT Pub. No.: WO2008/019743
PCT Pub. Date: Feb. 21, 2008

(65) Prior Publication Data
US 2010/0237285 A1    Sep. 23, 2010

(30) Foreign Application Priority Data
Aug. 16, 2006   (DE) ............... 10 2006 038 150 U

(51) Int. Cl.
*C09K 19/00* (2006.01)
*C09K 19/06* (2006.01)
*C09K 19/32* (2006.01)
*C09K 19/52* (2006.01)

(52) U.S. Cl. ........... 252/299.6; 252/299.01; 252/299.61; 252/299.62; 252/299.63; 252/299.64; 252/299.65; 252/299.66; 252/299.67; 430/20; 428/11; 570/126; 570/127; 570/129; 570/130; 570/131; 568/442

(58) Field of Classification Search ............ 252/299.01, 252/299.6–299.67; 430/20; 428/1.1; 570/126–131; 568/442
See application file for complete search history.

(56) References Cited

U.S. PATENT DOCUMENTS

| | | | |
|---|---|---|---|
| 6,475,595 B1 | 11/2002 | Bremer et al. | |
| 6,548,126 B1 * | 4/2003 | Sasada et al. | 252/299.63 |
| 6,685,995 B1 * | 2/2004 | Haseba et al. | 428/1.1 |
| 7,109,381 B2 * | 9/2006 | Poetsch et al. | 568/442 |
| 7,767,277 B2 * | 8/2010 | Lietzau et al. | 428/1.1 |
| 2004/0242905 A1 | 12/2004 | Poetsch et al. | |

FOREIGN PATENT DOCUMENTS

| | | |
|---|---|---|
| DE | 100 13 681 A1 | 11/2000 |
| EP | 0 786 445 A1 | 7/1997 |
| EP | 0 8440229 A | 5/1998 |
| EP | 1 029 842 A | 8/2000 |
| EP | 1 053 996 A1 | 11/2000 |
| EP | 1 081 123 A2 | 3/2001 |
| EP | 1 482 018 A | 12/2004 |

OTHER PUBLICATIONS

Stavber, Stojan et al. "High Yield Direct Fluorofunctionalisation of Ketones Using Accufluor ™—NFTh Fluorinating Reagent" Tetrahedron Letters, vol. 37, No. 20, pp. 3591-3594, Elsevier Science Ltd., Ljubljana, Slovenia.

Hossain, Azad M. "β-Fluoroenol Triflates: Synthesis and some palladium Catalyzed Reactions", Tetrahedron Letters, vol. 38, No. 1, pp. 49-52, Elsevier Science Ltd., Ridgefield, Conneticut, USA.

* cited by examiner

*Primary Examiner* — Geraldina Visconti
(74) *Attorney, Agent, or Firm* — Millen, White, Zelano & Branigan, P.C.

(57) ABSTRACT

The invention relates to liquid-crystalline compounds of the formula I

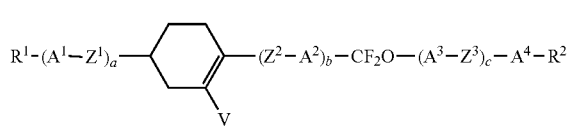

in which
$R^1$, $R^2$, $A^1$, $A^2$, $A^3$, $A^4$, $Z^1$, $Z^2$, $Z^3$, V, a, b and c have the meanings indicated in Claim 1, and to liquid-crystalline media comprising at least one compound of the formula I, and to electro-optical displays containing a liquid-crystalline medium of this type.

24 Claims, No Drawings

CYCLOHEXENE COMPOUNDS FOR LIQUID-CRYSTALLINE MIXTURES

The invention relates to 1,4-substituted cyclohexene derivatives and 2-fluorocyclohexene derivatives and to the use thereof as component(s) in liquid-crystalline media. In addition, the present invention relates to liquid-crystal and electro-optical display elements which contain the liquid-crystalline media according to the invention. The compounds according to the invention contain a difluoromethyleneoxy group in a certain arrangement.

In the preceding years, the areas of application of liquid-crystalline compounds have been considerably broadened to various types of display device, electro-optical devices, electronic components, sensors, etc. For this reason, a number of different structures have been proposed, in particular in the area of nematic liquid crystals. The nematic liquid-crystal mixtures have to date found the broadest application in flat display devices. They have been employed, in particular, in passive TN or STN matrix displays or systems having a TFT active matrix.

The liquid-crystalline compounds according to the invention can be used as component(s) of liquid-crystalline media, in particular for displays based on the principle of the twisted cell, the guest-host effect, the effect of deformation of aligned phases DAP or ECB (electrically controlled birefringence), the IPS (in-plane switching) effect or the effect of dynamic scattering.

The use of certain derivatives containing a difluoromethyleneoxy bridge (—CF$_2$O—) as liquid-crystalline substances is known to the person skilled in the art. The publication EP 844229 A1 discloses substances containing a cyclohexene ring and a CF$_2$O group. However, the double bond of the cyclohexene ring in the compounds is connected directly to the difluoromethylene unit of the CF$_2$O group. The publication EP 1482018 A1 discloses a substance containing a cyclohexene ring and a CF$_2$O group as synthetic intermediate which is not purified or characterised. The compound has a terminal ethyl ester group for the further chemical reaction.

In addition, various compounds containing a difluoromethyleneoxy bridge and no cyclohexene ring have already been described as liquid-crystalline material, as has the preparation thereof, such as, for example, in the publication EP 0786445 A1.

The present invention had the object of finding novel stable liquid-crystalline or mesogenic compounds which are suitable as component(s) of liquid-crystalline media. In particular, the compounds should simultaneously have comparatively low viscosity and a dielectric anisotropy in the positive region. For many current mixture concepts in the area of liquid crystals, it is advantageous to use compounds having high dielectric anisotropy $\Delta\in$.

In view of the very wide variety of areas of application of compounds of this type having high $\Delta\in$, it was desirable to have available further compounds, preferably having high nematogeneity, which have properties which are precisely customised to the particular applications.

It was thus an object of the invention to find novel stable liquid-crystalline or mesogenic compounds which are suitable as component(s) of liquid-crystalline media, in particular for, for example, TN, STN, IPS and TN-TFT displays.

It was a further object of the present invention to provide liquid-crystalline or mesogenic compounds which have, per se or in mixtures, high dielectric anisotropy $\Delta\in$, a high clearing point and low rotational viscosity $\gamma_1$. In addition, the compounds according to the invention should be thermally and photochemically stable under the conditions prevailing in the areas of application. Furthermore, the compounds according to the invention should as far as possible have a broad nematic phase. As mesogens, they should facilitate a broad nematic phase in mixtures with liquid-crystalline co-components and have excellent miscibility with nematic base mixtures, in particular at low temperatures. Preference is likewise given to substances having a low melting point and a low enthalpy of melting since these quantities are in turn a sign of the desirable properties mentioned above, such as, for example, high solubility and a broad liquid-crystalline phase, etc.

Surprisingly, it has been found that the cyclohexene derivatives according to the invention are eminently suitable as components of liquid-crystalline media. They can be used to obtain liquid-crystalline media, particularly suitable for TN-TFT and STN displays, but also for IPS systems or more recent concepts which require particularly high dielectric anisotropies. The compounds according to the invention have adequate stability and are colourless. They are also distinguished by strongly positive dielectric anisotropies $\Delta\in$, due to which lower threshold voltages are required on use in optical switching elements. They have a particularly broad nematic phase range. In addition, the compounds according to the invention have a high clearing point and at the same time low values for the rotational viscosity. Compared with substances from the prior art, significantly lower melting points and enthalpies of melting are observed.

The provision of the cyclohexene derivatives according to the invention very generally considerably broadens the range of liquid-crystalline substances which are suitable, from various applicational points of view, for the preparation of liquid-crystalline mixtures.

The cyclohexene derivatives according to the invention have a broad range of applications. Depending on the choice of substituents, these compounds can serve as base materials of which liquid-crystalline media are predominantly composed. However, it is also possible to add liquid-crystalline base materials from other classes of compound to the compounds according to the invention in order, for example, to modify the dielectric and/or optical anisotropy of a dielectric of this type and/or to optimise its threshold voltage and/or its viscosity.

The invention thus relates to compounds of the formula I

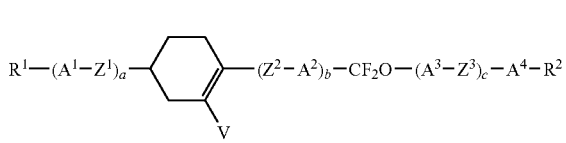

in which
  R$^1$ and R$^2$ each, independently of one another, denote H, F, Cl, Br, a halogenated or unsubstituted alkyl radical having 1 to 15 C atoms, where one or more CH$_2$ groups in these radicals may also each be replaced, independently of one another, by —C≡C—, —CH=CH—, —(CO)O—, —O(CO)—, —(CO)— or —O— in such a way that O atoms are not linked directly to one another, where R$^2$ may also denote CN, SCN, NCS or SF$_5$,
with the proviso that R$^1$ is not an ester group of the formula —(CO)O—C$_2$H$_5$, in particular not of the formula —(CO)O-alkyl,
  A$^1$, A$^2$, A$^3$ and A$^4$ each, independently of one another, identically or differently, denote:

a) trans-1,4-cyclohexylene or cyclohexenylene, in which, in addition, one or more non-adjacent CH$_2$ groups may be replaced by —O— and/or —S— and in which H may be substituted by F,
b) 1,4-phenylene, in which one or two CH groups may be replaced by N and in which, in addition, one or more H atoms may be replaced by Br, Cl, F, CN, methyl, methoxy or a mono- or polyfluorinated methyl or methoxy group, or c) a radical from the group 1,4-bicyclo[2.2.2]octylene, piperidine-1,4-diyl, cyclobutane-1,3-diyl, spiro[3.3]heptane-2,6-diyl,

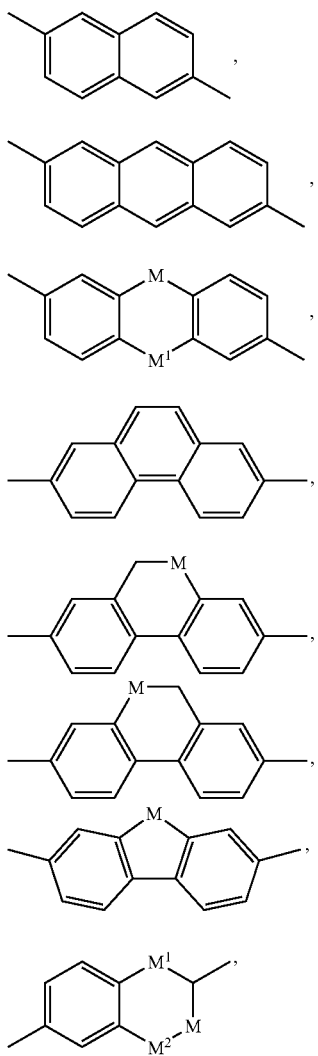

in which one or more hydrogen atoms may be substituted by F, CN, SCN, SF$_5$, CH$_2$F, CHF$_2$, CF$_3$, OCH$_2$F, OCHF$_2$ or OCF$_3$, one or more double bonds may be replaced by single bonds, M, M$^1$ or M$^2$ denotes —O—, —S—, —CH$_2$—, —CHY— or —CYY$^1$— in such a way that adjacent groups do not simultaneously denote —O— or —S—, and Y and Y$^1$ denote Cl, F, CN, OCF$_3$ or CF$_3$, V denotes H or F, Z$^1$, Z$^2$ and Z$^3$ each, independently of one another, identically or differently, denote a single bond, —CH$_2$O—, —(CO)O—, —CF$_2$O—, —CH$_2$CH$_2$CF$_2$O—, —CF$_2$CF$_2$—, —CH$_2$CF$_2$—, —CH$_2$CH$_2$—, —(CH$_2$)$_4$—, —CH=CH—, —CH=CF—, —CF=CF— or —C≡C—, where asymmetrical bridges may be oriented to both sides, and a denotes 0, 1 or 2, preferably 0 or 1, b denotes 1 or 2, preferably 1, and c denotes 0, 1 or 2, preferably 0, where a+b+c is ≦4.

A$^{1-3}$ and Z$^{1-3}$ can also independently adopt different meanings if they occur a number of times for a, b or c>1.

The invention furthermore relates to the use of the compounds of the formula I in liquid-crystalline media.

The present invention likewise relates to liquid-crystalline media having at least two liquid-crystalline components which comprise at least one cyclohexene derivative of the formula I.

The compounds of the formula I have a broad range of applications. Depending on the choice of substituents, these compounds can serve as base materials of which liquid-crystalline media are predominantly composed; however, it is also possible to add liquid-crystalline base materials from other classes of compound to compounds of the formula I in order, for example, to modify the dielectric and/or optical anisotropy of a dielectric of this type and/or to optimise its threshold voltage and/or its viscosity.

In the pure state, the compounds of the formula I are colourless and form, per se or in mixtures, liquid-crystalline mesophases in a temperature range which is favourably located for electro-optical use. The compounds according to the invention enable broad nematic phase ranges to be achieved. In liquid-crystalline mixtures, the substances according to the invention suppress smectic phases and result in a significant improvement in the low-temperature storage stability.

Preference is given to compounds of the formula I in which a is 0 or 1, in particular a=1.

Z$^1$ and/or Z$^3$ preferably denote a single bond, —CF$_2$O—, —OCF$_2$—, —C$_2$F$_4$—, —CH$_2$O—, —OCH$_2$— or —(CO)O—, in particular a single bond. Z$^2$ preferably denotes —CH$_2$CH$_2$—, —CH=CH—, —C≡C— or a single bond, in particular a single bond.

In the case where Z$^2$ is a single bond, A$^2$ preferably denotes an unsaturated or aromatic ring from group b) or c) according to the definition of formula I. In this case, the double bond of the cyclohexene is conjugated with the adjacent unsaturated ring A$^2$.

A$^1$, A$^2$, A$^3$ and A$^4$ preferably denote

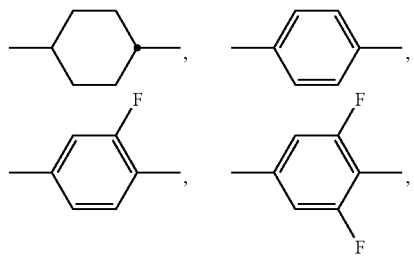

and furthermore

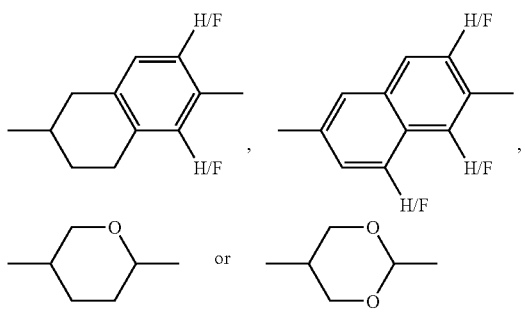

$A^2$ preferably denotes

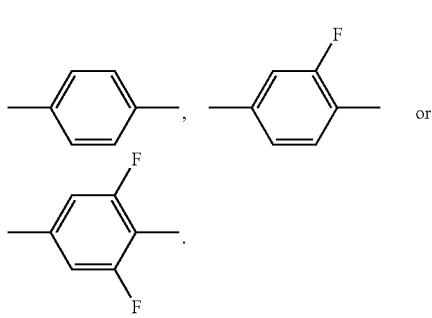

$A^4$ preferably denotes

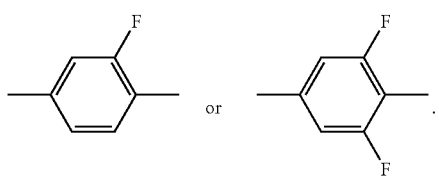

$R^1$ preferably denotes alkyl, alkoxy, alkenyl or alkenyloxy having up to 8 carbon atoms. $R^1$ particularly preferably denotes straight-chain alkyl or alkenyl.

$R^2$ preferably denotes X, where
    X denotes F, Cl, $OCF_3$, $OCHF_2$, $OCHFCF_3$, $OCF_2CHFCF_3$, $CF_3$, CN, $SF_5$, NCS, in particular F, Cl, CN or $OCF_3$ and very particularly F.

$R^1$ and $R^2$ preferably do not simultaneously denote H.

Particular preference is given to compounds of the formula IA

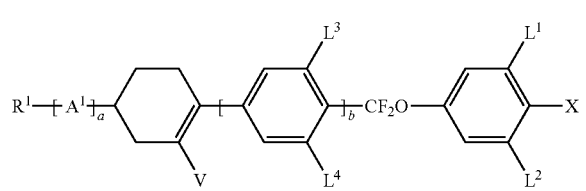

in which
$R^1$, $A^1$, X, a, b and V have the meanings indicated above for formula I, and $L^1$, $L^2$, $L^3$ and $L^4$ denote H or F.

Preference is given to compounds of the formula IA in which $L^1$ denotes fluorine. b preferably denotes 1. V is preferably H. $L^3$ is preferably F.

Particularly preferred compounds of the formula I are the compounds of the formulae I1 to I5

I1
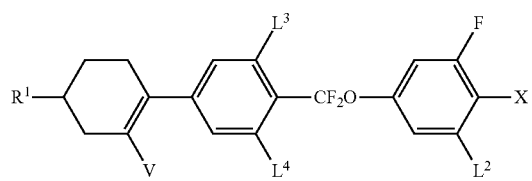

I2
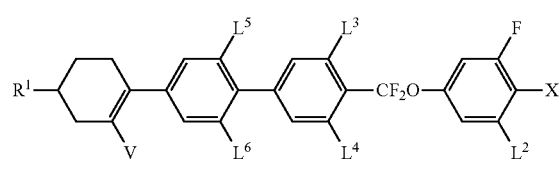

I3
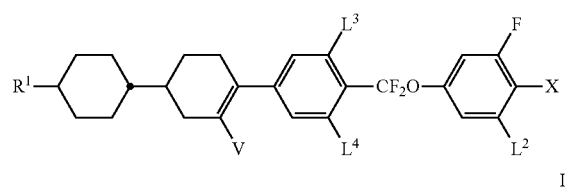

I4
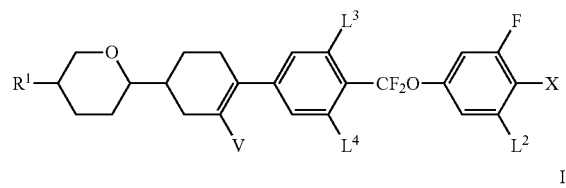

I5
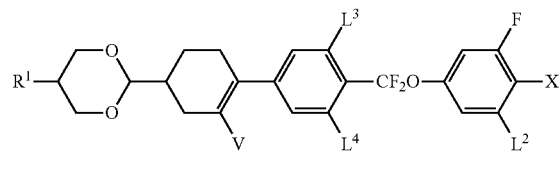

in which $R^1$, V and X have the meanings indicated above. $L^2$, $L^3$, $L^4$, $L^5$ and $L^6$, independently of one another, denote H or F.

In the case of compounds which can occur in diastereomers, both the pure substances and also any mixing ratio of the isomers are covered and in each case are to be regarded as suitable mixture component.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail.

The compounds of the formula I can advantageously be prepared as evident from the following illustrative syntheses (schemes 1 and 2):

Scheme 1. Synthesis of compounds conforming to formula I3. The alkyl-cyclohexane group can be varied.

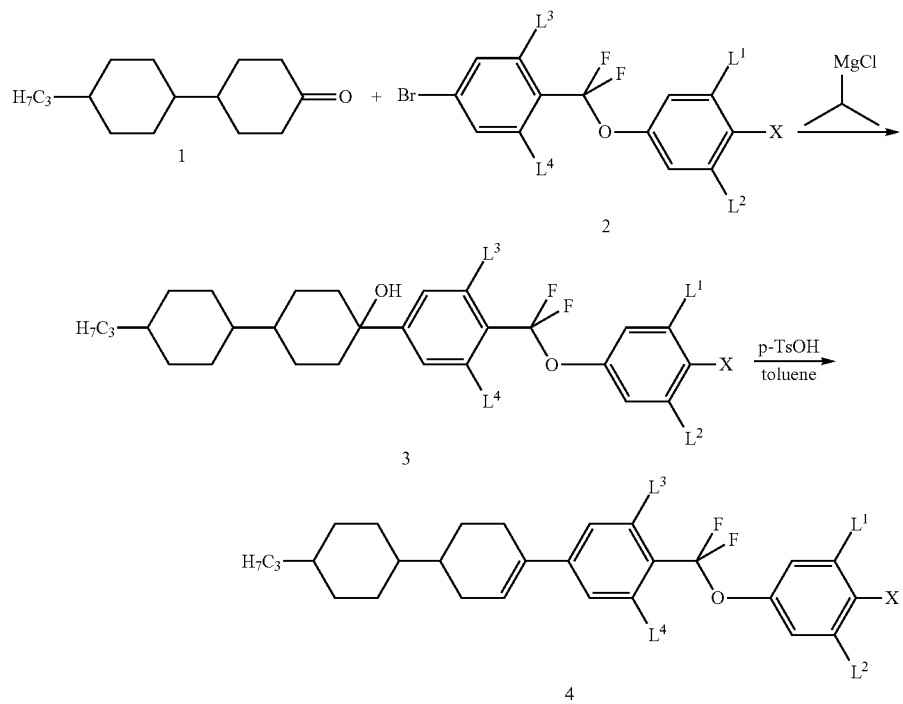

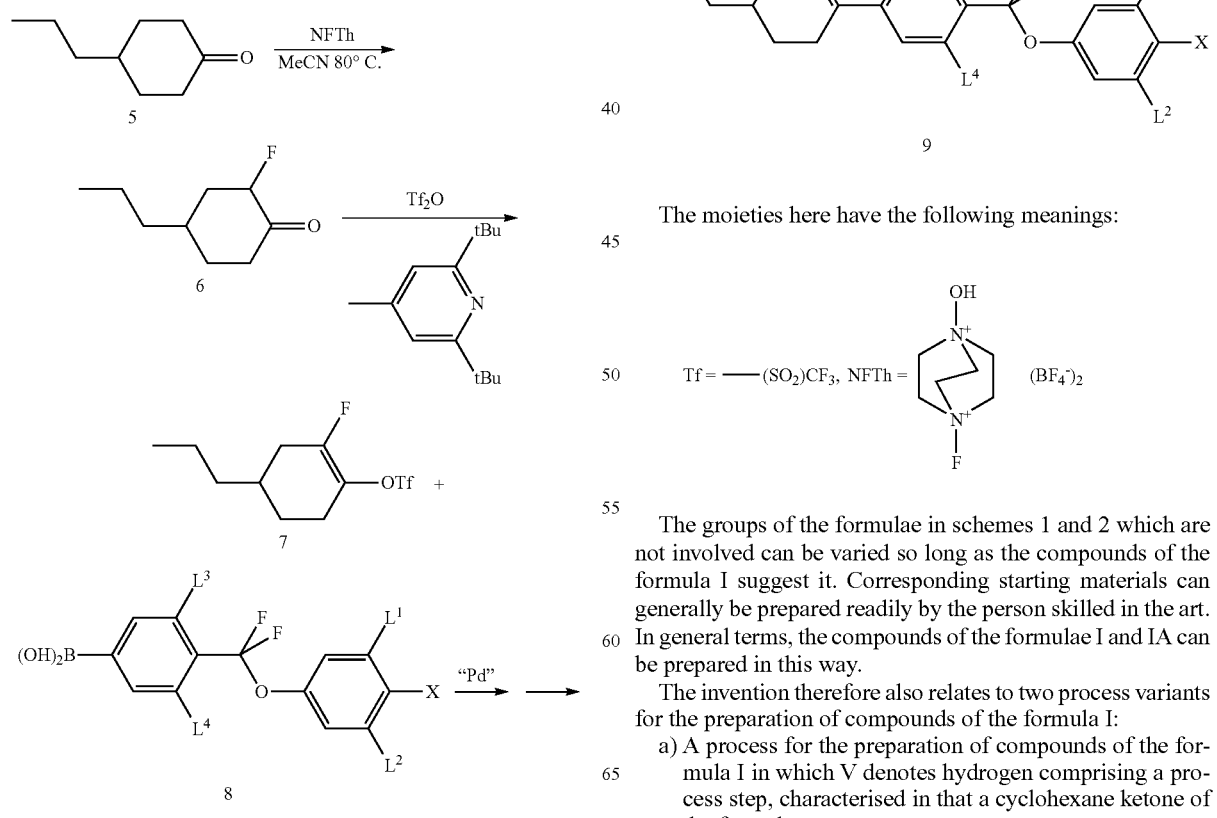

The moieties here have the following meanings:

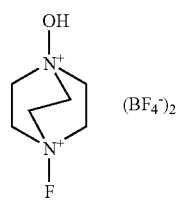

The groups of the formulae in schemes 1 and 2 which are not involved can be varied so long as the compounds of the formula I suggest it. Corresponding starting materials can generally be prepared readily by the person skilled in the art. In general terms, the compounds of the formulae I and IA can be prepared in this way.

The invention therefore also relates to two process variants for the preparation of compounds of the formula I:

a) A process for the preparation of compounds of the formula I in which V denotes hydrogen comprising a process step, characterised in that a cyclohexane ketone of the formula

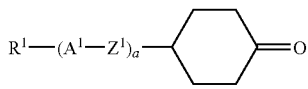

in which $R^1$, $A^1$, $Z^1$ and a are as defined in Claim 1, is reacted with an organomagnesium compound of the formula

in which $Z^2$, $Z^3$, $A^2$, $A^3$, $A^4$, b, c and $R^2$ are as defined in Claim 1, and Hal denotes Cl or Br.

The alcohol formed after work-up is preferably eliminated to give a cyclohexene compound of the formula I. This is preferably achieved by addition of a catalytic amount of acid, in particular p-toluenesulfonic acid (p-TsOH).

b) A process for the preparation of compounds of the formula I according to Claim 1 in which V denotes hydrogen or fluorine comprising a process step, characterised in that a cyclohexane of the formula

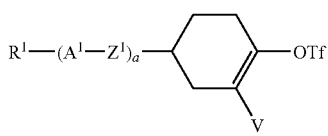

in which $R^1$, $A^1$, $Z^1$, V and a are as defined in Claim 1, is reacted with a boronic acid or an open-chain or cyclic boronic acid ester of the formulae

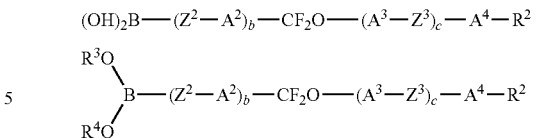

in which $Z^2$, $Z^3$, $A^2$, $A^3$, $A^4$, b, c and $R^2$ are as defined in Claim 1, and $R^3$, $R^4$ denote alkyl having 1-12 C atoms or $R^3+R^4$ together also denote an alkylene, in particular of the formulae

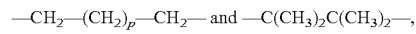

or 1,2-phenylene, where $R^1$, $R^2$ and $R^1+R^2$ may also be substituted and where p is 0 or 1, in the presence of a transition-metal catalyst, preferably a palladium complex. The complex is preferably bis(triphenylphosphine)palladium(II) chloride.

Compounds according to the invention in which $A^2$ denotes an optionally substituted 1,4-phenylene and b has the value 2 are advantageously prepared analogously in accordance with scheme 3.

Scheme 3. Synthesis of compounds conforming to formula I2.

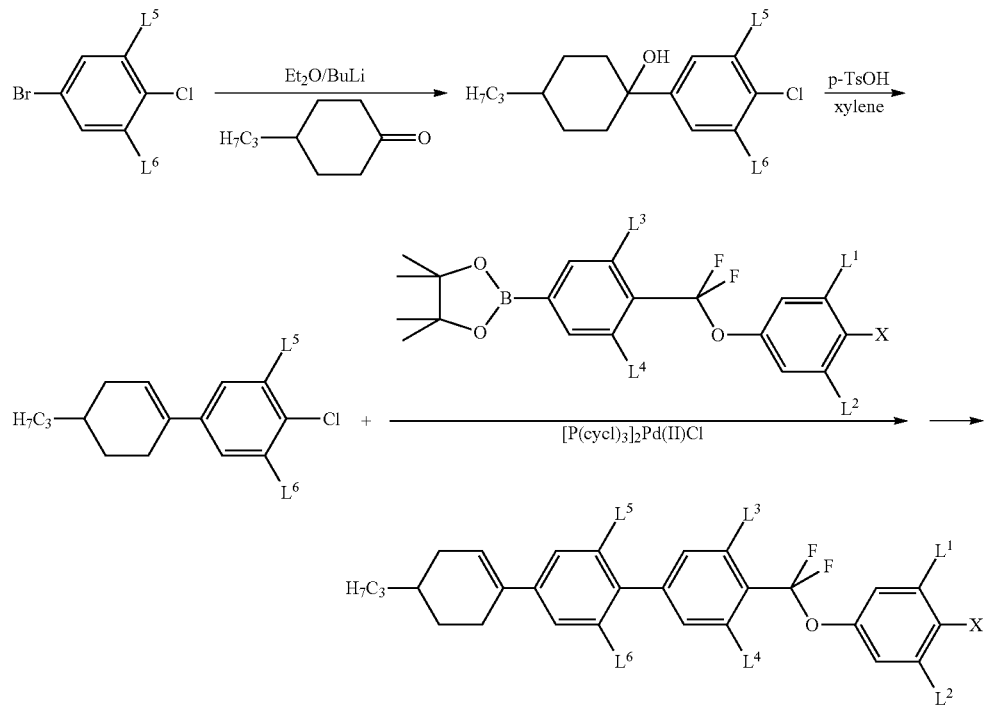

Further preferred process variants are revealed by the examples.

The invention also relates to liquid-crystalline media comprising one or more of the compounds of the formula I according to the invention. The liquid-crystalline media comprise at least two components. They are preferably obtained by mixing the components with one another. A process according to the invention for the preparation of a liquid-crystalline medium is therefore characterised in that at least one compound of the formula I is mixed with at least one further mesogenic compound, and additives are optionally added.

The achievable combinations of clearing point, viscosity at low temperature, thermal and UV stability and dielectric anisotropy are far superior to previous materials from the prior art.

The liquid-crystalline media according to the invention preferably comprise 2 to 40, particularly preferably 4 to 30, components as further constituents besides one or more compounds according to the invention. In particular, these media comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclehexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexanes, 1,4-biscyclohexylbenzenes, 4,4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of the media according to the invention can be characterised by the formulae 1, 2, 3, 4 and 5:

R'-L-E-R"  1

R'-L-COO-E-R"  2

R'-L-CF$_2$O-E-R"  3

R'-L-CH$_2$CH$_2$-E-R"  4

R'-L-C≡C-E-R"  5

In the formulae 1, 2, 3, 4 and 5, L and E, which may be identical or different, each, independently of one another, denote a divalent radical from the group formed by -Phe-, -Cyc-, -Phe-Phe-, -Phe-Cyc-, -Cyc-Cyc-, -Pyr-, -Dio-, -Py-, -G-Phe- and -G-Cyc- and their mirror images, where Phe denotes unsubstituted or fluorine-substituted 1,4-phenylene, Cyc denotes trans-1,4-cyclohexylene, Pyr denotes pyrimidine-2,5-diyl or pyridine-2,5-diyl, Dio denotes 1,3-dioxane-2,5-diyl, Py denotes tetrahydropyran-2,5-diyl and G denotes 2-(trans-1,4-cyclohexyl)ethyl.

One of the radicals L and E is preferably Cyc, Phe or Pyr. E is preferably Cyc, Phe or Phe-Cyc. The media according to the invention preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe, Py and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

R' and/or R" each, independently of one another, denote alkyl, alkenyl, alkoxy, alkoxyalkyl, alkenyloxy or alkanoyloxy having up to 8 C atoms, —F, —Cl, —CN, —NCS or —(O)$_i$CH$_{3-k}$F$_k$, where i is 0 or 1 and k is 1, 2 or 3.

In a smaller sub-group of the compounds of the formulae 1, 2, 3, 4 and 5, R' and R" each, independently of one another, denote alkyl, alkenyl, alkoxy, alkoxyalkyl, alkenyloxy or alkanoyloxy having up to 8 C atoms. This smaller sub-group is called group A below, and the compounds are referred to by the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5, which is referred to as group B, R" denotes —F, —Cl, —NCS or —(O)$_i$CH$_{3-k}$F$_k$, where i is 0 or 1 and k is 1, 2 or 3. The compounds in which R" has this meaning are referred to by the sub-formulae 1b, 2b, 3b, 4b and 5b. Particular preference is given to those compounds of the sub-formulae 1b, 2b, 3b, 4b and 5b in which R" has the meaning —F, —Cl, —NCS, —CF$_3$, —OCHF$_2$ or —OCF$_3$.

In the compounds of the sub-formulae 1b, 2b, 3b, 4b and 5b, R' has the meanings indicated in the case of the compounds of the sub-formulae 1a to 5a and is preferably alkyl, alkenyl, alkoxy or alkoxyalkyl.

In a further smaller sub-group of the compounds of the formulae 1, 2, 3, 4 and 5, R" denotes —CN. This sub-group is referred to below as group C, and the compounds of this sub-group are correspondingly described by sub-formulae 1c, 2c, 3c, 4c and 5c. In the compounds of the sub-formulae 1c, 2c, 3c, 4c and 5c, R' has the meanings indicated in the case of the compounds of the sub-formulae 1a to 5a and is preferably alkyl, alkoxy or alkenyl.

Besides the preferred compounds of groups A, B and C, other compounds of the formulae 1, 2, 3, 4 and 5 having other variants of the proposed substituents are also customary. All these substances are obtainable by methods which are known from the literature or analogously thereto.

Besides compounds of the formula I according to the invention, the media according to the invention preferably comprise one or more compounds selected from groups A, B and/or C. The proportions by weight of the compounds from these groups in the media according to the invention are preferably:

group A: 0 to 90%, preferably 20 to 90%, particularly preferably 30 to 90%;

group B: 0 to 80%, preferably 10 to 80%, particularly preferably 10 to 65%;

group C: 0 to 80%, preferably 0 to 80%, particularly preferably 0 to 50%;

where the sum of the proportions by weight of the group A, B and/or C compounds present in the respective media according to the invention is preferably 5 to 90% and particularly preferably 10 to 90%.

The media according to the invention preferably comprise 1 to 40%, particularly preferably 5 to 30%, of the compounds according to the invention.

The liquid-crystal mixtures according to the invention are prepared in a manner which is conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, for example homologue mixtures, or using so-called "multi-bottle" systems.

The dielectrics may also comprise further additives known to the person skilled in the art and described in the literature. For example, 0 to 15%, preferably 0 to 10%, of pleochroic dyes, chiral dopants, stabilisers or nanoparticles can be added. The individual compounds added are employed in concentrations of 0.01 to 6%, preferably 0.1 to 3%. However, the concentration data of the other constituents of the liquid-crystal mixtures, i.e. the liquid-crystalline or mesogenic compounds are given here without taking into account the concentration of these additives.

The liquid-crystal mixtures according to the invention enable a significant broadening of the available parameter latitude.

The invention also relates to electro-optical displays (in particular TFT displays having two plane-parallel outer plates, which, together with a frame, form a cell, integrated non-linear elements for switching individual pixels on the outer plates, and a nematic liquid-crystal mixture having positive dielectric anisotropy and high specific resistance located in the cell) which contain media of this type, and to the use of these media for electro-optical purposes.

The term "alkyl" encompasses straight-chain and branched alkyl groups having 1-9 carbon atoms, in particular the straight-chain groups methyl, ethyl, propyl, butyl, pentyl, hexyl and heptyl. Groups having 2-5 carbon atoms are generally preferred.

The term "alkenyl" encompasses straight-chain and branched alkenyl groups having up to 9 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "halogenated alkyl radical" preferably encompasses mono- or polyfluorinated and/or chlorinated radicals. Perhalogenated radicals are included. Particular preference is given to fluorinated alkyl radicals, in particular $CF_3$, $CH_2CF_3$, $CH_2CHF_2$, $CHF_2$, $CH_2F$, $CHFCF_3$ and $CF_2CHFCF_3$.

The total amount of compounds of the formula I in the mixtures according to the invention is not crucial. The mixtures may therefore comprise one or more further components for the purposes of optimisation of various properties. However, the observed effect on the response times and the threshold voltage is generally greater, the higher the total concentration of compounds of the formulae I to XV.

The construction of the matrix display according to the invention from polarisers, electrode base plates and surface-treated electrodes corresponds to the usual design for displays of this type. The term usual design is broadly drawn here and also encompasses all derivatives and modifications of the matrix display, in particular also matrix display elements based on poly-Si TFTs.

A significant difference between the displays according to the invention and the hitherto conventional ones based on the twisted nematic cell consists, however, in the choice of the liquid-crystal parameters of the liquid-crystal layer.

The following examples are intended to explain the invention without restricting it. Above and below, percentage data denote percent by weight. All temperatures are indicated in degrees Celsius. Furthermore, C=crystalline state, N=nematic phase, S=smectic phase and I=isotropic phase. The data between these symbols represent the transition temperatures. Δn denotes optical anisotropy (589 nm, 20° C.), Δ∈ the dielectric anisotropy (1 kHz, 20° C.) and $\gamma_1$ the rotational viscosity (in the unit mPa·s).

The physical, physicochemical and electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

The dielectric anisotropy Δ∈ of the individual substances is determined at 20° C. and 1 kHz. To this end, 5-10% by weight of the substance to be investigated are measured dissolved in the dielectrically positive mixture ZLI-4792 (Merck KGaA), and the measurement value is extrapolated to a concentration of 100%. The optical anisotropy Δn is determined at 20° C. and a wavelength of 589.3 nm, the rotational viscosity $\gamma_1$ at 20° C., both likewise by linear extrapolation.

The following abbreviations are used:

| | |
|---|---|
| p-TsOH | p-toluenesulfonic acid |
| THF | tetrahydrofuran |
| MTB ether | methyl t-butyl ether |

EXAMPLE 1

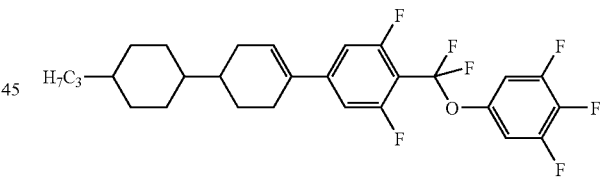

Step 1.1

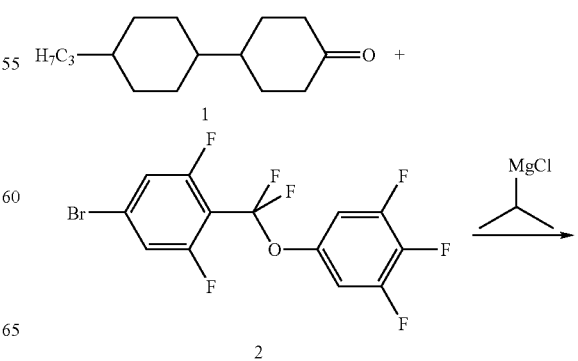

-continued

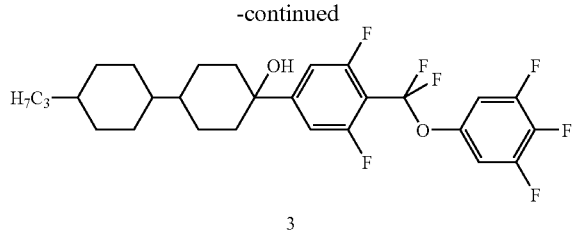

3

A solution of 62.1 g (160 mmol) of the bromide 2 in 300 ml of THF is added at 20° C. under nitrogen to 96 ml (190 mmol) of a 2 M solution of isopropylmagnesium chloride in THF. After 1 h, 29.0 g (190 mmol) of the ketone 1, dissolved in 200 ml of THF, are added, likewise at 20° C. After a further hour, the batch is hydrolysed using 250 ml of water, acidified using 1 N hydrochloric acid and diluted with 500 ml of heptane. The aqueous phase is extracted with MTB ether. The combined organic phases are washed with sat. sodium hydrogencarbonate solution, dried over sodium sulfate and evaporated. The substance 3 is employed in the subsequent step without further purification.

Step 1.2

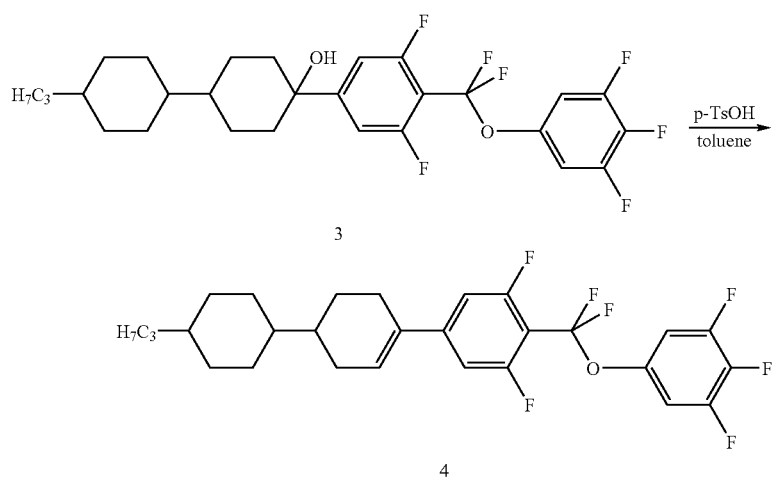

68.1 g (130 mmol) of the alcohol 1 are dissolved in 400 ml of toluene, and 1.1 g (10 mmol) of p-toluenesulfonic acid monohydrate are added, and the mixture is heated on a water separator for 2 h. The solvent is subsequently removed, and the residue obtained is passed over silica gel with toluene. Crystallisation from ethanol and n-heptane.

C 63 N 155 I $\Delta \epsilon$ 21

$\Delta n$ 0.132

The following compounds of the formula

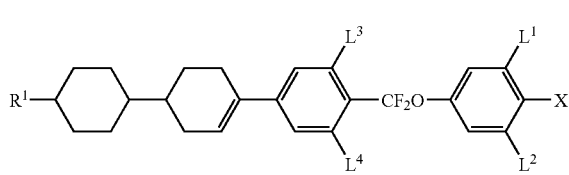

are prepared analogously:

| $R^1$ | X | $L^1$ | $L^2$ | $L^3$ | $L^4$ | Values |
|---|---|---|---|---|---|---|
| H | F | H | H | H | H | |
| $CH_3$ | F | H | H | H | H | |
| $C_2H_5$ | F | H | H | H | H | |
| $C_3H_7$ | F | H | H | H | H | |
| n-$C_4H_9$ | F | H | H | H | H | |
| n-$C_5H_{11}$ | F | H | H | H | H | |
| n-$C_6H_{13}$ | F | H | H | H | H | |
| H | F | F | H | H | H | |
| $CH_3$ | F | F | H | H | H | |
| $C_2H_5$ | F | F | H | H | H | |
| n-$C_3H_7$ | F | F | H | H | H | C 56 Sm 81 SmB 105 N 207 I; $\Delta\epsilon$ 12; $\Delta n$ 0.155 |
| n-$C_4H_9$ | F | F | H | H | H | |
| n-$C_5H_{11}$ | F | F | H | H | H | |
| n-$C_6H_{13}$ | F | F | H | H | H | |
| H | F | F | F | H | H | |
| $CH_3$ | F | F | F | H | H | |
| $C_2H_5$ | F | F | F | H | H | |
| n-$C_3H_7$ | F | F | F | H | H | C 81 N 183 I; $\Delta\epsilon$ 16; $\Delta n$ 0.148 |
| n-$C_4H_9$ | F | F | F | H | H | |
| n-$C_5H_{11}$ | F | F | F | H | H | |

-continued

| $R^1$ | X | $L^1$ | $L^2$ | $L^3$ | $L^4$ | Values |
|---|---|---|---|---|---|---|
| n-$C_6H_{13}$ | F | F | F | H | H | |
| H | $OCF_3$ | H | H | H | H | |
| $CH_3$ | $OCF_3$ | H | H | H | H | |
| $C_2H_5$ | $OCF_3$ | H | H | H | H | |
| n-$C_3H_7$ | $OCF_3$ | H | H | H | H | |
| n-$C_4H_9$ | $OCF_3$ | H | H | H | H | |
| n-$C_5H_{11}$ | $OCF_3$ | H | H | H | H | |
| n-$C_6H_{13}$ | $OCF_3$ | H | H | H | H | |
| H | $OCF_3$ | F | H | H | H | |
| $CH_3$ | $OCF_3$ | F | H | H | H | |
| $C_2H_5$ | $OCF_3$ | F | H | H | H | |
| n-$C_3H_7$ | $OCF_3$ | F | H | H | H | C 59 Sm 117 SmB 127 SmC 129 N 209 I; $\Delta\epsilon$ 14; $\Delta n$ 0.150 |
| n-$C_4H_9$ | $OCF_3$ | F | H | H | H | |
| n-$C_5H_{11}$ | $OCF_3$ | F | H | H | H | |
| n-$C_6H_{13}$ | $OCF_3$ | F | H | H | H | |
| H | $OCF_3$ | F | F | H | H | |
| $CH_3$ | $OCF_3$ | F | F | H | H | |
| $C_2H_5$ | $OCF_3$ | F | F | H | H | |
| n-$C_3H_7$ | $OCF_3$ | F | F | H | H | C 58 SmB 76 N 191 I; $\Delta\epsilon$ 16; $\Delta n$ 0.142 |

| R¹ | X | L¹ | L² | L³ | L⁴ | Values |
|---|---|---|---|---|---|---|
| n-C₄H₉ | OCF₃ | F | F | H | H | |
| n-C₅H₁₁ | OCF₃ | F | F | H | H | |
| n-C₆H₁₃ | OCF₃ | F | F | H | H | |
| H | CN | H | H | H | H | |
| CH₃ | CN | H | H | H | H | |
| C₂H₅ | CN | H | H | H | H | |
| n-C₃H₇ | CN | H | H | H | H | |
| n-C₄H₉ | CN | H | H | H | H | |
| n-C₅H₁₁ | CN | H | H | H | H | |
| n-C₆H₁₃ | CN | H | H | H | H | |
| H | CN | F | H | H | H | |
| CH₃ | CN | F | H | H | H | |
| C₂H₅ | CN | F | H | H | H | |
| n-C₃H₇ | CN | F | H | H | H | |
| n-C₄H₉ | CN | F | H | H | H | |
| n-C₅H₁₁ | CN | F | H | H | H | |
| n-C₆H₁₃ | CN | F | H | H | H | |
| H | CN | F | F | H | H | |
| CH₃ | CN | F | F | H | H | |
| C₂H₅ | CN | F | F | H | H | |
| n-C₃H₇ | CN | F | F | H | H | |
| n-C₄H₉ | CN | F | F | H | H | |
| n-C₅H₁₁ | CN | F | F | H | H | |
| n-C₆H₁₃ | CN | F | F | H | H | |
| H | F | H | H | F | H | |
| CH₃ | F | H | H | F | H | |
| C₂H₅ | F | H | H | F | H | |
| C₃H₇ | F | H | H | F | H | |
| n-C₄H₉ | F | H | H | F | H | |
| n-C₅H₁₁ | F | H | H | F | H | |
| n-C₆H₁₃ | F | H | H | F | H | |
| H | F | F | H | F | H | |
| CH₃ | F | F | H | F | H | |
| C₂H₅ | F | F | H | F | H | |
| n-C₃H₇ | F | F | H | F | H | |
| n-C₄H₉ | F | F | H | F | H | |
| n-C₅H₁₁ | F | F | H | F | H | |
| n-C₆H₁₃ | F | F | H | F | H | |
| H | F | F | F | F | H | |
| CH₃ | F | F | F | F | H | |
| C₂H₅ | F | F | F | F | H | |
| n-C₃H₇ | F | F | F | F | H | |
| n-C₄H₉ | F | F | F | F | H | |
| n-C₅H₁₁ | F | F | F | F | H | |
| n-C₆H₁₃ | F | F | F | F | H | |
| H | OCF₃ | H | H | F | H | |
| CH₃ | OCF₃ | H | H | F | H | |
| C₂H₅ | OCF₃ | H | H | F | H | |
| n-C₃H₇ | OCF₃ | H | H | F | H | |
| n-C₄H₉ | OCF₃ | H | H | F | H | |
| n-C₅H₁₁ | OCF₃ | H | H | F | H | |
| n-C₆H₁₃ | OCF₃ | H | H | F | H | |
| H | OCF₃ | F | H | F | H | |
| CH₃ | OCF₃ | F | H | F | H | |
| C₂H₅ | OCF₃ | F | H | F | H | |
| n-C₃H₇ | OCF₃ | F | H | F | H | |
| n-C₄H₉ | OCF₃ | F | H | F | H | |
| n-C₅H₁₁ | OCF₃ | F | H | F | H | |
| n-C₆H₁₃ | OCF₃ | F | H | F | H | |
| H | OCF₃ | F | F | F | H | |
| CH₃ | OCF₃ | F | F | F | H | |
| C₂H₅ | OCF₃ | F | F | F | H | |
| n-C₃H₇ | OCF₃ | F | F | F | H | |
| n-C₄H₉ | OCF₃ | F | F | F | H | |
| n-C₅H₁₁ | OCF₃ | F | F | F | H | |
| n-C₆H₁₃ | OCF₃ | F | F | F | H | |
| H | CN | H | H | F | H | |
| CH₃ | CN | H | H | F | H | |
| C₂H₅ | CN | H | H | F | H | |
| n-C₃H₇ | CN | H | H | F | H | |
| n-C₄H₉ | CN | H | H | F | H | |
| n-C₅H₁₁ | CN | H | H | F | H | |
| n-C₆H₁₃ | CN | H | H | F | H | |
| H | CN | F | H | F | H | |
| CH₃ | CN | F | H | F | H | |
| C₂H₅ | CN | F | H | F | H | |
| n-C₃H₇ | CN | F | H | F | H | |
| n-C₄H₉ | CN | F | H | F | H | |
| n-C₅H₁₁ | CN | F | H | F | H | |
| n-C₆H₁₃ | CN | F | H | F | H | |
| H | CN | F | F | F | H | |
| CH₃ | CN | F | F | F | H | |
| C₂H₅ | CN | F | F | F | H | |
| n-C₃H₇ | CN | F | F | F | H | |
| n-C₄H₉ | CN | F | F | F | H | |
| n-C₅H₁₁ | CN | F | F | F | H | |
| n-C₆H₁₃ | CN | F | F | F | H | |
| H | F | H | H | F | F | |
| CH₃ | F | H | H | F | F | |
| C₂H₅ | F | H | H | F | F | |
| n-C₄H₉ | F | H | H | F | F | |
| n-C₅H₁₁ | F | H | H | F | F | |
| n-C₆H₁₃ | F | H | H | F | F | |
| H | F | F | H | F | F | |
| CH₃ | F | F | H | F | F | |
| C₂H₅ | F | F | H | F | F | |
| n-C₃H₇ | F | F | H | F | F | |
| n-C₄H₉ | F | F | H | F | F | |
| n-C₅H₁₁ | F | F | H | F | F | |
| n-C₆H₁₃ | F | F | H | F | F | |
| H | F | F | F | F | F | |
| CH₃ | F | F | F | F | F | |
| —CH=CH₂ | F | F | F | F | F | |
| C₂H₅ | F | F | F | F | F | C 57 N 131 I; Δε 22; Δn 0.124; γ₁ 367 mPa·s cf. Example 1 |
| n-C₃H₇ | F | F | F | F | F | |
| n-C₄H₉ | F | F | F | F | F | C 65 N 150 I; Δε 21; Δn 0.124 |
| n-C₅H₁₁ | F | F | F | F | F | C 71 N 156 I; Δε 20; Δn 0.133 |
| n-C₆H₁₃ | F | F | F | F | F | |
| n-C₇H₁₅ | F | F | F | F | F | |
| H | OCF₃ | H | H | F | F | |
| CH₃ | OCF₃ | H | H | F | F | |
| C₂H₅ | OCF₃ | H | H | F | F | |
| n-C₃H₇ | OCF₃ | H | H | F | F | |
| n-C₄H₉ | OCF₃ | H | H | F | F | |
| n-C₅H₁₁ | OCF₃ | H | H | F | F | |
| n-C₆H₁₃ | OCF₃ | H | H | F | F | |
| H | OCF₃ | F | H | F | F | |
| CH₃ | OCF₃ | F | H | F | F | |
| C₂H₅ | OCF₃ | F | H | F | F | |
| n-C₃H₇ | OCF₃ | F | H | F | F | |
| n-C₄H₉ | OCF₃ | F | H | F | F | |
| n-C₅H₁₁ | OCF₃ | F | H | F | F | |
| n-C₆H₁₃ | OCF₃ | F | H | F | F | |
| H | OCF₃ | F | F | F | F | |
| CH₃ | OCF₃ | F | F | F | F | |
| C₂H₅ | OCF₃ | F | F | F | F | |
| n-C₃H₇ | OCF₃ | F | F | F | F | |
| n-C₄H₉ | OCF₃ | F | F | F | F | |
| n-C₅H₁₁ | OCF₃ | F | F | F | F | |
| n-C₆H₁₃ | OCF₃ | F | F | F | F | |
| H | CN | H | H | F | F | |
| CH₃ | CN | H | H | F | F | |
| C₂H₅ | CN | H | H | F | F | |
| n-C₃H₇ | CN | H | H | F | F | |
| n-C₄H₉ | CN | H | H | F | F | |
| n-C₅H₁₁ | CN | H | H | F | F | |
| n-C₆H₁₃ | CN | H | H | F | F | |
| H | CN | F | H | F | F | |
| CH₃ | CN | F | H | F | F | |
| C₂H₅ | CN | F | H | F | F | |
| n-C₃H₇ | CN | F | H | F | F | |
| n-C₄H₉ | CN | F | H | F | F | |
| n-C₅H₁₁ | CN | F | H | F | F | |
| n-C₆H₁₃ | CN | F | H | F | F | |
| H | CN | F | F | F | F | |
| CH₃ | CN | F | F | F | F | |
| C₂H₅ | CN | F | F | F | F | |
| n-C₃H₇ | CN | F | F | F | F | |
| n-C₄H₉ | CN | F | F | F | F | |
| n-C₅H₁₁ | CN | F | F | F | F | |
| n-C₆H₁₃ | CN | F | F | F | F | |
| n-C₇H₁₅ | CN | F | F | F | F | |

EXAMPLE 2

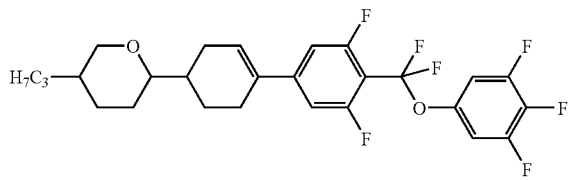

Step 2.1

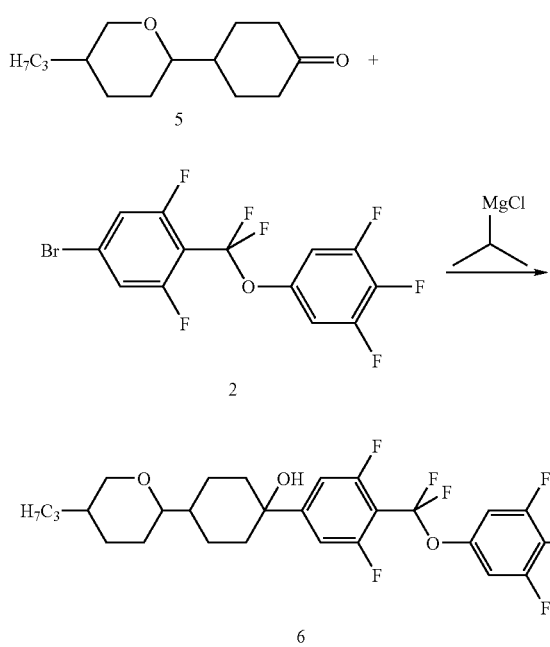

Analogously to Example 1, step 1.1, the cyclohexane ketone 5 is reacted with the bromide 2, which has previously been metallated. The substance 6 is employed in the subsequent step without further purification.

Step 2.2

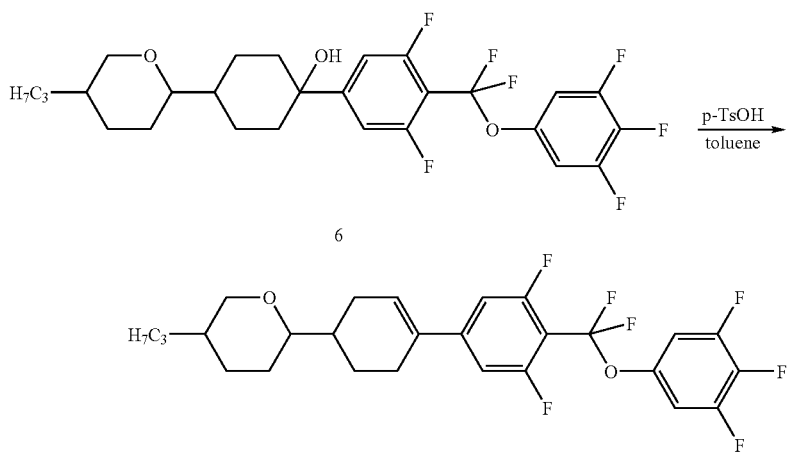

Analogously to Example 1, step 1.2, the intermediate 6 from step 2.1 is eliminated using p-TsOH to give the cyclohexene 7. The solvent is subsequently removed, and the residue obtained is passed over silica gel with toluene. Crystallisation from ethanol and n-heptane.

C 56 N 121 I

Δε 27

Δn 0.123

The compounds are formed as diastereomer mixtures of the two trans-isomers on the tetrahydropyran (about 1:1, HPLC). Unless indicated otherwise, the values apply to the diastereomer mixtures formed.

The following compounds of the formula

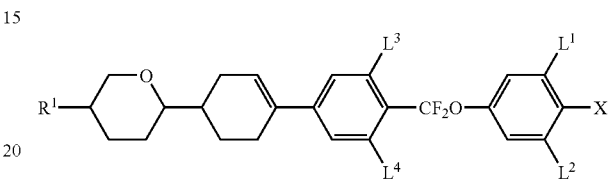

are prepared analogously:

| $R^1$ | X | $L^1$ | $L^2$ | $L^3$ | $L^4$ | Values |
|---|---|---|---|---|---|---|
| H | F | H | H | F | F | |
| $CH_3$ | F | H | H | F | F | |
| $C_2H_5$ | F | H | H | F | F | |
| n-$C_4H_9$ | F | H | H | F | F | |
| n-$C_5H_{11}$ | F | H | H | F | F | |
| n-$C_6H_{13}$ | F | H | H | F | F | |
| H | F | F | H | F | F | |
| $CH_3$ | F | F | H | F | F | |
| $C_2H_5$ | F | F | H | F | F | |
| n-$C_3H_7$ | F | F | H | F | F | |
| n-$C_4H_9$ | F | F | H | F | F | |
| n-$C_5H_{11}$ | F | F | H | F | F | |
| n-$C_6H_{13}$ | F | F | H | F | F | |
| H | F | F | F | F | F | |
| $CH_3$ | F | F | F | F | F | |
| $C_2H_5$ | F | F | F | F | F | C 66 N 96 I; Δε 27; Δn 0.120 |
| n-$C_3H_7$ | F | F | F | F | F | cf. Example 2 |
| n-$C_4H_9$ | F | F | F | F | F | C 32 N 116 I; Δε 26; Δn 0.118 |
| n-$C_5H_{11}$ | F | F | F | F | F | C 62 N 119 I; Δε 25; Δn 0.123 |

-continued

| R¹ | X | L¹ | L² | L³ | L⁴ | Values |
|---|---|---|---|---|---|---|
| n-C₆H₁₃ | F | F | F | F | F | |
| n-C₇H₁₅ | F | F | F | F | F | |
| H | OCF₃ | H | H | F | F | |
| CH₃ | OCF₃ | H | H | F | F | |
| C₂H₅ | OCF₃ | H | H | F | F | |
| n-C₄H₉ | OCF₃ | H | H | F | F | |
| n-C₅H₁₁ | OCF₃ | H | H | F | F | |
| n-C₆H₁₃ | OCF₃ | H | H | F | F | |
| H | OCF₃ | F | H | F | F | |
| CH₃ | OCF₃ | F | H | F | F | |
| C₂H₅ | OCF₃ | F | H | F | F | |
| n-C₃H₇ | OCF₃ | F | H | F | F | C 5 SmA 110 N 143 I; Δε 22; Δn 0.125 |
| n-C₄H₉ | OCF₃ | F | H | F | F | |
| n-C₅H₁₁ | OCF₃ | F | H | F | F | |
| n-C₆H₁₃ | OCF₃ | F | H | F | F | |
| H | OCF₃ | F | F | F | F | |
| CH₃ | OCF₃ | F | F | F | F | |
| C₂H₅ | OCF₃ | F | F | F | F | |
| n-C₃H₇ | OCF₃ | F | F | F | F | C 43 SmA 105 N 144 I; Δε 23; Δn 0.129 |
| n-C₄H₉ | OCF₃ | F | F | F | F | |
| n-C₅H₁₁ | OCF₃ | F | F | F | F | |
| n-C₆H₁₃ | OCF₃ | F | F | F | F | |
| n-C₇H₁₅ | OCF₃ | F | F | F | F | |
| H | F | H | H | H | H | |
| CH₃ | F | H | H | H | H | |
| C₂H₅ | F | H | H | H | H | |
| n-C₄H₉ | F | H | H | H | H | |
| n-C₅H₁₁ | F | H | H | H | H | |
| n-C₆H₁₃ | F | H | H | H | H | |
| H | F | F | H | H | H | |
| CH₃ | F | F | H | H | H | |
| C₂H₅ | F | F | H | H | H | |
| n-C₃H₇ | F | F | H | H | H | C 44 SmB 142 SmA 179 N 187 I; Δε 18; Δn 0.142 |
| n-C₄H₉ | F | F | H | H | H | |
| n-C₅H₁₁ | F | F | H | H | H | |
| n-C₆H₁₃ | F | F | H | H | H | |
| H | F | F | F | H | H | |
| CH₃ | F | F | F | H | H | |
| C₂H₅ | F | F | F | H | H | |
| n-C₃H₇ | F | F | F | H | H | C 68 SmB 108 SmA 114 N 161 I; Δε 20; Δn 0.140 |
| n-C₄H₉ | F | F | F | H | H | |
| n-C₅H₁₁ | F | F | F | H | H | |
| n-C₆H₁₃ | F | F | F | H | H | |
| n-C₇H₁₅ | F | F | F | H | H | |
| H | OCF₃ | H | H | H | H | |
| CH₃ | OCF₃ | H | H | H | H | |
| C₂H₅ | OCF₃ | H | H | H | H | |
| n-C₄H₉ | OCF₃ | H | H | H | H | |
| n-C₅H₁₁ | OCF₃ | H | H | H | H | |
| n-C₆H₁₃ | OCF₃ | H | H | H | H | |
| H | OCF₃ | F | H | H | H | |
| CH₃ | OCF₃ | F | H | H | H | |
| C₂H₅ | OCF₃ | F | H | H | H | |
| n-C₃H₇ | OCF₃ | F | H | H | H | |
| n-C₄H₉ | OCF₃ | F | H | H | H | |
| n-C₅H₁₁ | OCF₃ | F | H | H | H | |
| n-C₆H₁₃ | OCF₃ | F | H | H | H | |
| H | OCF₃ | F | F | H | H | |
| CH₃ | OCF₃ | F | F | H | H | |
| C₂H₅ | OCF₃ | F | F | H | H | |
| n-C₃H₇ | OCF₃ | F | F | H | H | C 57 SmB 95 SmA 134 N 169 I; Δε 22; Δn 0.138 |
| n-C₄H₉ | OCF₃ | F | F | H | H | |
| n-C₅H₁₁ | OCF₃ | F | F | H | H | |
| n-C₆H₁₃ | OCF₃ | F | F | H | H | |
| n-C₇H₁₅ | OCF₃ | F | F | H | H | |

EXAMPLE 3

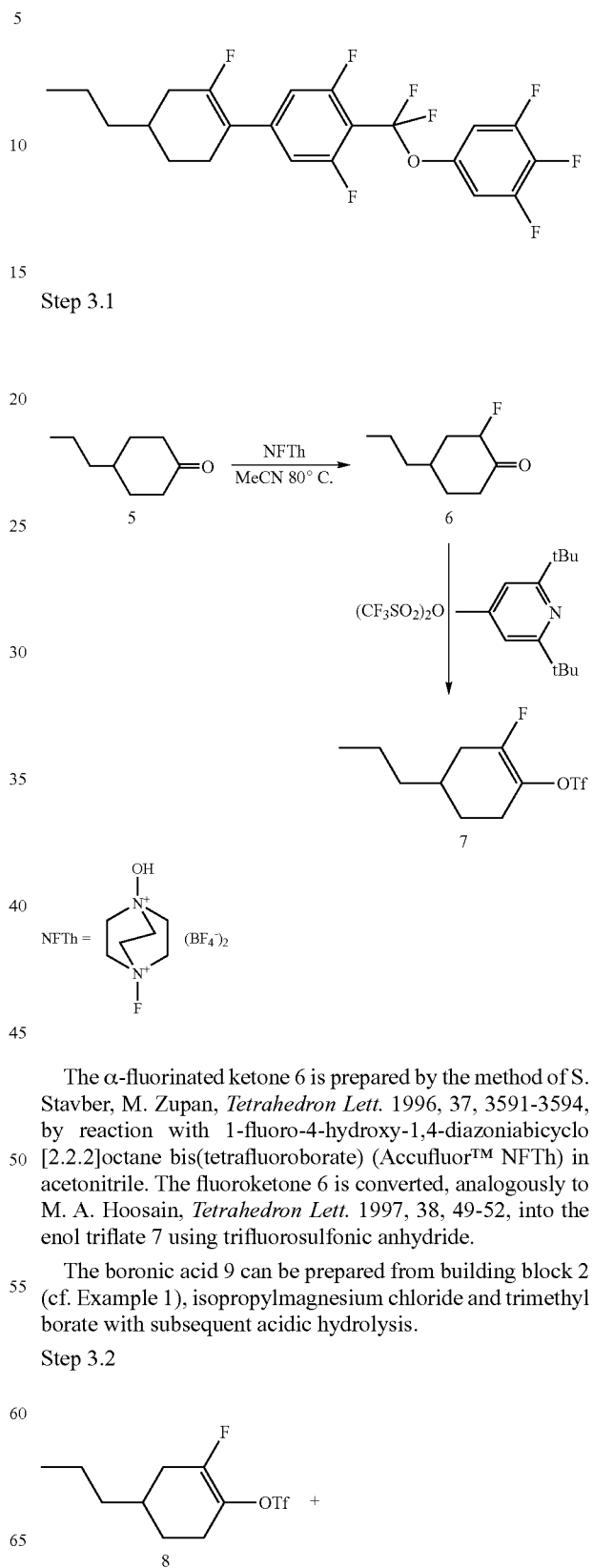

Step 3.1

The α-fluorinated ketone 6 is prepared by the method of S. Stavber, M. Zupan, *Tetrahedron Lett.* 1996, 37, 3591-3594, by reaction with 1-fluoro-4-hydroxy-1,4-diazoniabicyclo[2.2.2]octane bis(tetrafluoroborate) (Accufluor™ NFTh) in acetonitrile. The fluoroketone 6 is converted, analogously to M. A. Hoosain, *Tetrahedron Lett.* 1997, 38, 49-52, into the enol triflate 7 using trifluorosulfonic anhydride.

The boronic acid 9 can be prepared from building block 2 (cf. Example 1), isopropylmagnesium chloride and trimethyl borate with subsequent acidic hydrolysis.

Step 3.2

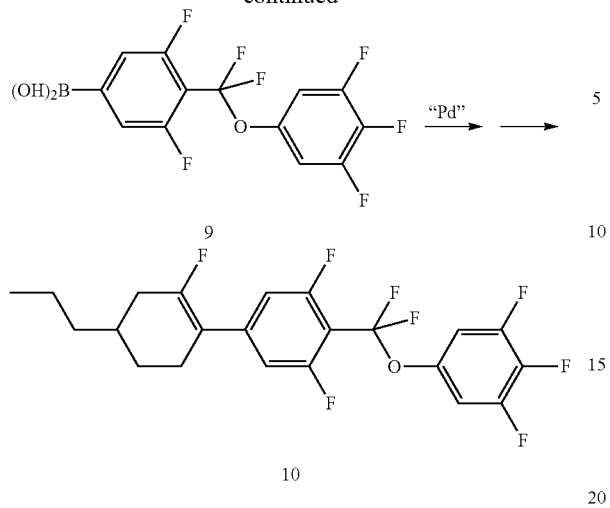

Under nitrogen, 24.5 g (74 mmol) of sodium metaborate octahydrate are initially introduced in 30 ml of water, and 30 ml of THF, 700 ml of bis(triphenylphosphine)palladium(II) chloride and 0.1 ml of 80% hydrazinium hydroxide are added. After 5 minutes, 14.5 g (50 mmol) of the triflate 8 and 17.7 g (50 mmol) of the boronic acid 9 as well as a further 30 ml of THF are added. The batch is refluxed for 6 h. The cooled mixture is diluted with 100 ml of MTB ether. The organic phase is evaporated, and the residue is purified on silica gel (toluene). Crystallisation from ethanol and n-heptane.

The following compounds of the formula

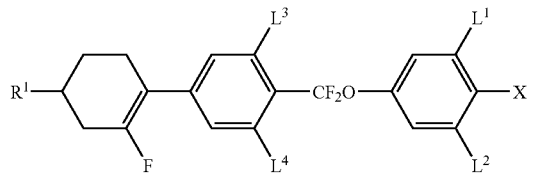

are prepared analogously:

| $R^1$ | X | $L^1$ | $L^2$ | $L^3$ | $L^4$ |
|---|---|---|---|---|---|
| H | F | H | H | H | H |
| $CH_3$ | F | H | H | H | H |
| $C_2H_5$ | F | H | H | H | H |
| $C_3H_7$ | F | H | H | H | H |
| n-$C_4H_9$ | F | H | H | H | H |
| n-$C_5H_{11}$ | F | H | H | H | H |
| n-$C_6H_{13}$ | F | H | H | H | H |
| H | F | F | H | H | H |
| $CH_3$ | F | F | H | H | H |
| $C_2H_5$ | F | F | H | H | H |
| n-$C_3H_7$ | F | F | H | H | H |
| n-$C_4H_9$ | F | F | H | H | H |
| n-$C_5H_{11}$ | F | F | H | H | H |
| n-$C_6H_{13}$ | F | F | H | H | H |
| H | F | F | F | H | H |
| $CH_3$ | F | F | F | H | H |
| n-$C_4H_9$ | F | F | F | H | H |
| n-$C_5H_{11}$ | F | F | F | H | H |
| n-$C_6H_{13}$ | F | F | F | H | H |
| H | $OCF_3$ | H | H | H | H |
| $CH_3$ | $OCF_3$ | H | H | H | H |
| $C_2H_5$ | $OCF_3$ | H | H | H | H |
| n-$C_3H_7$ | $OCF_3$ | H | H | H | H |
| n-$C_4H_9$ | $OCF_3$ | H | H | H | H |
| n-$C_5H_{11}$ | $OCF_3$ | H | H | H | H |
| n-$C_6H_{13}$ | $OCF_3$ | H | H | H | H |
| H | $OCF_3$ | F | H | H | H |
| $CH_3$ | $OCF_3$ | F | H | H | H |
| $C_2H_5$ | $OCF_3$ | F | H | H | H |
| n-$C_3H_7$ | $OCF_3$ | F | H | H | H |
| n-$C_4H_9$ | $OCF_3$ | F | H | H | H |
| n-$C_5H_{11}$ | $OCF_3$ | F | H | H | H |
| n-$C_6H_{13}$ | $OCF_3$ | F | H | H | H |
| H | $OCF_3$ | F | F | H | H |
| $CH_3$ | $OCF_3$ | F | F | H | H |
| $C_2H_5$ | $OCF_3$ | F | F | H | H |
| n-$C_3H_7$ | $OCF_3$ | F | F | H | H |
| n-$C_4H_9$ | $OCF_3$ | F | F | H | H |
| n-$C_5H_{11}$ | $OCF_3$ | F | F | H | H |
| n-$C_6H_{13}$ | $OCF_3$ | F | F | H | H |
| H | CN | H | H | H | H |
| $CH_3$ | CN | H | H | H | H |
| $C_2H_5$ | CN | H | H | H | H |
| n-$C_3H_7$ | CN | H | H | H | H |
| n-$C_4H_9$ | CN | H | H | H | H |
| n-$C_5H_{11}$ | CN | H | H | H | H |
| n-$C_6H_{13}$ | CN | H | H | H | H |
| H | CN | F | H | H | H |
| $CH_3$ | CN | F | H | H | H |
| $C_2H_5$ | CN | F | H | H | H |
| n-$C_3H_7$ | CN | F | H | H | H |
| n-$C_4H_9$ | CN | F | H | H | H |
| n-$C_5H_{11}$ | CN | F | H | H | H |
| n-$C_6H_{13}$ | CN | F | H | H | H |
| H | CN | F | F | H | H |
| $CH_3$ | CN | F | F | H | H |
| $C_2H_5$ | CN | F | F | H | H |
| n-$C_3H_7$ | CN | F | F | H | H |
| n-$C_4H_9$ | CN | F | F | H | H |
| n-$C_5H_{11}$ | CN | F | F | H | H |
| n-$C_6H_{13}$ | CN | F | F | H | H |
| H | F | H | H | F | H |
| $CH_3$ | F | H | H | F | H |
| $C_2H_5$ | F | H | H | F | H |
| $C_3H_7$ | F | H | H | F | H |
| n-$C_4H_9$ | F | H | H | F | H |
| n-$C_5H_{11}$ | F | H | H | F | H |
| n-$C_6H_{13}$ | F | H | H | F | H |
| H | F | F | H | F | H |
| $CH_3$ | F | F | H | F | H |
| $C_2H_5$ | F | F | H | F | H |
| n-$C_3H_7$ | F | F | H | F | H |
| n-$C_4H_9$ | F | F | H | F | H |
| n-$C_5H_{11}$ | F | F | H | F | H |
| n-$C_6H_{13}$ | F | F | H | F | H |
| H | F | F | F | F | H |
| $CH_3$ | F | F | F | F | H |
| $C_2H_5$ | F | F | F | F | H |
| n-$C_3H_7$ | F | F | F | F | H |
| n-$C_4H_9$ | F | F | F | F | H |
| n-$C_5H_{11}$ | F | F | F | F | H |
| n-$C_6H_{13}$ | F | F | F | F | H |
| H | $OCF_3$ | H | H | F | H |
| $CH_3$ | $OCF_3$ | H | H | F | H |
| $C_2H_5$ | $OCF_3$ | H | H | F | H |
| n-$C_3H_7$ | $OCF_3$ | H | H | F | H |
| n-$C_4H_9$ | $OCF_3$ | H | H | F | H |
| n-$C_5H_{11}$ | $OCF_3$ | H | H | F | H |
| n-$C_6H_{13}$ | $OCF_3$ | H | H | F | H |
| H | $OCF_3$ | F | H | F | H |
| $CH_3$ | $OCF_3$ | F | H | F | H |
| $C_2H_5$ | $OCF_3$ | F | H | F | H |
| n-$C_3H_7$ | $OCF_3$ | F | H | F | H |
| n-$C_4H_9$ | $OCF_3$ | F | H | F | H |
| n-$C_5H_{11}$ | $OCF_3$ | F | H | F | H |
| n-$C_6H_{13}$ | $OCF_3$ | F | H | F | H |
| H | $OCF_3$ | F | F | F | H |
| $CH_3$ | $OCF_3$ | F | F | F | H |
| $C_2H_5$ | $OCF_3$ | F | F | F | H |
| n-$C_3H_7$ | $OCF_3$ | F | F | F | H |
| n-$C_4H_9$ | $OCF_3$ | F | F | F | H |

| R¹ | X | L¹ | L² | L³ | L⁴ |
|---|---|---|---|---|---|
| n-C₅H₁₁ | OCF₃ | F | F | F | H |
| n-C₆H₁₃ | OCF₃ | F | F | F | H |
| H | CN | H | H | F | H |
| CH₃ | CN | H | H | F | H |
| C₂H₅ | CN | H | H | F | H |
| n-C₃H₇ | CN | H | H | F | H |
| n-C₄H₉ | CN | H | H | F | H |
| n-C₅H₁₁ | CN | H | H | F | H |
| n-C₆H₁₃ | CN | H | H | F | H |
| H | CN | F | H | F | H |
| CH₃ | CN | F | H | F | H |
| C₂H₅ | CN | F | H | F | H |
| n-C₃H₇ | CN | F | H | F | H |
| n-C₄H₉ | CN | F | H | F | H |
| n-C₅H₁₁ | CN | F | H | F | H |
| n-C₆H₁₃ | CN | F | H | F | H |
| H | CN | F | F | F | H |
| CH₃ | CN | F | F | F | H |
| C₂H₅ | CN | F | F | F | H |
| n-C₃H₇ | CN | F | F | F | H |
| n-C₄H₉ | CN | F | F | F | H |
| n-C₅H₁₁ | CN | F | F | F | H |
| n-C₆H₁₃ | CN | F | F | F | H |
| H | F | H | H | F | F |
| CH₃ | F | H | H | F | F |
| C₂H₅ | F | H | H | F | F |
| n-C₄H₉ | F | H | H | F | F |
| n-C₅H₁₁ | F | H | H | F | F |
| n-C₆H₁₃ | F | H | H | F | F |
| H | F | F | H | F | F |
| CH₃ | F | F | H | F | F |
| C₂H₅ | F | F | H | F | F |
| n-C₃H₇ | F | F | H | F | F |
| n-C₄H₉ | F | F | H | F | F |
| n-C₅H₁₁ | F | F | H | F | F |
| n-C₆H₁₃ | F | F | H | F | F |
| H | F | F | F | F | F |
| CH₃ | F | F | F | F | F |
| C₂H₅ | F | F | F | F | F |
| C₂H₅ | F | F | F | F | F |
| n-C₃H₇ | F | F | F | F | F |
| n-C₄H₉ | F | F | F | F | F |
| n-C₅H₁₁ | F | F | F | F | F |
| n-C₆H₁₃ | F | F | F | F | F |
| H | OCF₃ | H | H | F | F |
| CH₃ | OCF₃ | H | H | F | F |
| C₂H₅ | OCF₃ | H | H | F | F |
| n-C₃H₇ | OCF₃ | H | H | F | F |
| n-C₄H₉ | OCF₃ | H | H | F | F |
| n-C₅H₁₁ | OCF₃ | H | H | F | F |
| n-C₆H₁₃ | OCF₃ | H | H | F | F |
| H | OCF₃ | F | H | F | F |
| CH₃ | OCF₃ | F | H | F | F |
| C₂H₅ | OCF₃ | F | H | F | F |
| n-C₃H₇ | OCF₃ | F | H | F | F |
| n-C₄H₉ | OCF₃ | F | H | F | F |
| n-C₅H₁₁ | OCF₃ | F | H | F | F |
| n-C₆H₁₃ | OCF₃ | F | H | F | F |
| H | OCF₃ | F | F | F | F |
| CH₃ | OCF₃ | F | F | F | F |
| C₂H₅ | OCF₃ | F | F | F | F |
| n-C₃H₇ | OCF₃ | F | F | F | F |
| n-C₄H₉ | OCF₃ | F | F | F | F |
| n-C₅H₁₁ | OCF₃ | F | F | F | F |
| n-C₆H₁₃ | OCF₃ | F | F | F | F |
| H | CN | H | H | F | F |
| CH₃ | CN | H | H | F | F |
| C₂H₅ | CN | H | H | F | F |
| n-C₃H₇ | CN | H | H | F | F |
| n-C₄H₉ | CN | H | H | F | F |
| n-C₅H₁₁ | CN | H | H | F | F |
| n-C₆H₁₃ | CN | H | H | F | F |
| H | CN | F | H | F | F |
| CH₃ | CN | F | H | F | F |
| C₂H₅ | CN | F | H | F | F |
| n-C₃H₇ | CN | F | H | F | F |
| n-C₄H₉ | CN | F | H | F | F |
| n-C₅H₁₁ | CN | F | H | F | F |
| n-C₆H₁₃ | CN | F | H | F | F |
| H | CN | F | F | F | F |
| CH₃ | CN | F | F | F | F |
| C₂H₅ | CN | F | F | F | F |
| n-C₃H₇ | CN | F | F | F | F |
| n-C₄H₉ | CN | F | F | F | F |
| n-C₅H₁₁ | CN | F | F | F | F |
| n-C₆H₁₃ | CN | F | F | F | F |

EXAMPLE 4

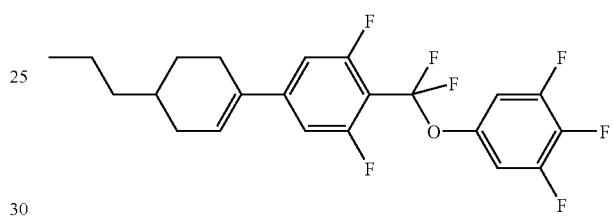

Step 4.1

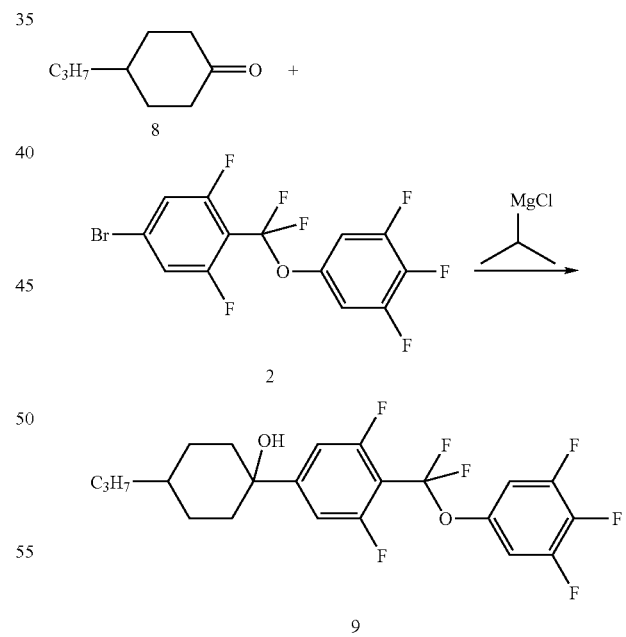

A solution of 62.1 g (160 mmol) of the bromide 2 in 300 ml of THF is added at 20° C. under nitrogen to 96 ml (190 mmol) of a 2 M solution of isopropylmagnesium chloride in THF. After 1 h, 190 mmol of the ketone 11, dissolved in 200 ml of THF, are added, likewise at 20° C. The work-up is carried out analogously to step 1.1. Substance 12 is employed in the subsequent step without further purification.

Step 4.2

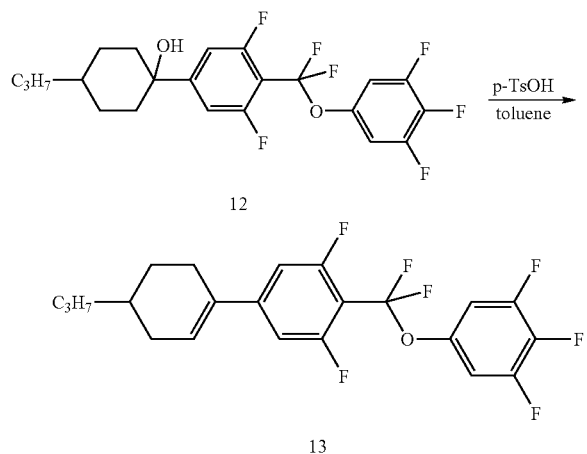

The reaction and purification are carried out analogously to step 1.2.
C 22 I
Δε 21
Δn 0.095
γ₁ 68 mPa·s The following compounds of the formula

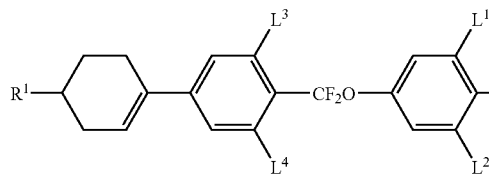

where $L^3$=F are prepared analogously to Example 4:

| $R^1$ | X | $L^1$ | $L^2$ | $L^3$ | $L^4$ | Values |
|---|---|---|---|---|---|---|
| H | F | H | H | F | H | |
| CH₃ | F | H | H | F | H | |
| C₂H₅ | F | H | H | F | H | |
| C₃H₇ | F | H | H | F | H | |
| n-C₄H₉ | F | H | H | F | H | |
| n-C₅H₁₁ | F | H | H | F | H | |
| n-C₆H₁₃ | F | H | H | F | H | |
| H | F | F | H | F | H | |
| CH₃ | F | F | H | F | H | |
| C₂H₅ | F | F | H | F | H | |
| n-C₃H₇ | F | F | H | F | H | C 28 N (−7) I; Δε 17; Δn 0.106; γ₁ 112 mPa·s |
| n-C₄H₉ | F | F | H | F | H | |
| n-C₅H₁₁ | F | F | H | F | H | |
| n-C₆H₁₃ | F | F | H | F | H | |
| H | F | F | F | F | H | |
| CH₃ | F | F | F | F | H | |
| C₂H₅ | F | F | F | F | H | |
| n-C₃H₇ | F | F | F | F | H | C 28 N (−7) I; Δε 17; Δn 0.106; γ₁ 112 mPa·s |
| n-C₄H₉ | F | F | F | F | H | |
| n-C₅H₁₁ | F | F | F | F | H | |
| n-C₆H₁₃ | F | F | F | F | H | |
| H | OCF₃ | H | H | F | H | |
| CH₃ | OCF₃ | H | H | F | H | |
| C₂H₅ | OCF₃ | H | H | F | H | |
| C₃H₇ | OCF₃ | H | H | F | H | |
| n-C₄H₉ | OCF₃ | H | H | F | H | |
| n-C₅H₁₁ | OCF₃ | H | H | F | H | |
| n-C₆H₁₃ | OCF₃ | H | H | F | H | |
| H | OCF₃ | F | H | F | H | |
| CH₃ | OCF₃ | F | H | F | H | |
| C₂H₅ | OCF₃ | F | H | F | H | |
| n-C₃H₇ | OCF₃ | F | H | F | H | |
| n-C₄H₉ | OCF₃ | F | H | F | H | |
| n-C₅H₁₁ | OCF₃ | F | H | F | H | |
| n-C₆H₁₃ | OCF₃ | F | H | F | H | |
| H | OCF₃ | F | F | F | H | |
| CH₃ | OCF₃ | F | F | F | H | |
| C₂H₅ | OCF₃ | F | F | F | H | |
| n-C₃H₇ | OCF₃ | F | F | F | H | |
| n-C₄H₉ | OCF₃ | F | F | F | H | |
| n-C₅H₁₁ | OCF₃ | F | F | F | H | |
| n-C₆H₁₃ | OCF₃ | F | F | F | H | |
| H | Cl | H | H | F | H | |
| CH₃ | Cl | H | H | F | H | |
| C₂H₅ | Cl | H | H | F | H | |
| C₃H₇ | Cl | H | H | F | H | |
| n-C₄H₉ | Cl | H | H | F | H | |
| n-C₅H₁₁ | Cl | H | H | F | H | |
| n-C₆H₁₃ | Cl | H | H | F | H | |
| H | Cl | F | H | F | H | |
| CH₃ | Cl | F | H | F | H | |
| C₂H₅ | Cl | F | H | F | H | |
| n-C₃H₇ | Cl | F | H | F | H | |
| n-C₄H₉ | Cl | F | H | F | H | |
| n-C₅H₁₁ | Cl | F | H | F | H | |
| n-C₆H₁₃ | Cl | F | H | F | H | |
| H | Cl | F | F | F | H | |
| CH₃ | Cl | F | F | F | H | |
| C₂H₅ | Cl | F | F | F | H | |
| n-C₃H₇ | Cl | F | F | F | H | |
| n-C₄H₉ | Cl | F | F | F | H | |
| n-C₅H₁₁ | Cl | F | F | F | H | |
| n-C₆H₁₃ | Cl | F | F | F | H | |
| H | OCHF₂ | H | H | F | H | |
| CH₃ | OCHF₂ | H | H | F | H | |
| C₂H₅ | OCHF₂ | H | H | F | H | |
| n-C₃H₇ | OCHF₂ | H | H | F | H | |
| n-C₄H₉ | OCHF₂ | H | H | F | H | |
| n-C₅H₁₁ | OCHF₂ | H | H | F | H | |
| n-C₆H₁₃ | OCHF₂ | H | H | F | H | |
| H | OCHF₂ | F | H | F | H | |
| CH₃ | OCHF₂ | F | H | F | H | |
| C₂H₅ | OCHF₂ | F | H | F | H | |
| n-C₃H₇ | OCHF₂ | F | H | F | H | |
| n-C₄H₉ | OCHF₂ | F | H | F | H | |
| n-C₅H₁₁ | OCHF₂ | F | H | F | H | |
| n-C₆H₁₃ | OCHF₂ | F | H | F | H | |
| H | OCHF₂ | F | F | F | H | |
| CH₃ | OCHF₂ | F | F | F | H | |
| C₂H₅ | OCHF₂ | F | F | F | H | |
| n-C₃H₇ | OCHF₂ | F | F | F | H | |
| n-C₄H₉ | OCHF₂ | F | F | F | H | |
| n-C₅H₁₁ | OCHF₂ | F | F | F | H | |
| n-C₆H₁₃ | OCHF₂ | F | F | F | H | |
| H | OCHFCF₃ | H | H | F | H | |
| CH₃ | OCHFCF₃ | H | H | F | H | |
| C₂H₅ | OCHFCF₃ | H | H | F | H | |
| n-C₃H₇ | OCHFCF₃ | H | H | F | H | |
| n-C₄H₉ | OCHFCF₃ | H | H | F | H | |
| n-C₅H₁₁ | OCHFCF₃ | H | H | F | H | |
| n-C₆H₁₃ | OCHFCF₃ | H | H | F | H | |
| H | OCHFCF₃ | F | H | F | H | |
| CH₃ | OCHFCF₃ | F | H | F | H | |
| C₂H₅ | OCHFCF₃ | F | H | F | H | |
| n-C₃H₇ | OCHFCF₃ | F | H | F | H | |
| n-C₄H₉ | OCHFCF₃ | F | H | F | H | |
| n-C₅H₁₁ | OCHFCF₃ | F | H | F | H | |
| n-C₆H₁₃ | OCHFCF₃ | F | H | F | H | |
| H | OCHFCF₃ | F | F | F | H | |
| CH₃ | OCHFCF₃ | F | F | F | H | |
| C₂H₅ | OCHFCF₃ | F | F | F | H | |
| n-C₃H₇ | OCHFCF₃ | F | F | F | H | |
| n-C₄H₉ | OCHFCF₃ | F | F | F | H | |

| R¹ | X | L¹ | L² | L³ | L⁴ | Values |
|---|---|---|---|---|---|---|
| n-C₅H₁₁ | OCHFCF₃ | F | F | F | H | |
| n-C₆H₁₃ | OCHFCF₃ | F | F | F | H | |
| H | OCHFCF₃ | H | H | F | H | |
| CH₃ | OCHFCF₃ | H | H | F | H | |
| C₂H₅ | OCHFCF₃ | H | H | F | H | |
| n-C₃H₇ | OCHFCF₃ | H | H | F | H | |
| n-C₄H₉ | OCHFCF₃ | H | H | F | H | |
| n-C₅H₁₁ | OCHFCF₃ | H | H | F | H | |
| n-C₆H₁₃ | OCHFCF₃ | H | H | F | H | |
| H | OCHFCF₃ | F | H | F | H | |
| CH₃ | OCHFCF₃ | F | H | F | H | |
| C₂H₅ | OCHFCF₃ | F | H | F | H | |
| n-C₃H₇ | OCHFCF₃ | F | H | F | H | |
| n-C₄H₉ | OCHFCF₃ | F | H | F | H | |
| n-C₅H₁₁ | OCHFCF₃ | F | H | F | H | |
| n-C₆H₁₃ | OCHFCF₃ | F | H | F | H | |
| H | OCHFCF₃ | F | F | F | H | |
| CH₃ | OCHFCF₃ | F | F | F | H | |
| C₂H₅ | OCHFCF₃ | F | F | F | H | |
| n-C₃H₇ | OCHFCF₃ | F | F | F | H | |
| n-C₄H₉ | OCHFCF₃ | F | F | F | H | |
| n-C₅H₁₁ | OCHFCF₃ | F | F | F | H | |
| n-C₆H₁₃ | OCHFCF₃ | F | F | F | H | |
| H | NCS | H | H | F | H | |
| CH₃ | NCS | H | H | F | H | |
| C₂H₅ | NCS | H | H | F | H | |
| n-C₃H₇ | NCS | H | H | F | H | |
| n-C₄H₉ | NCS | H | H | F | H | |
| n-C₅H₁₁ | NCS | H | H | F | H | |
| n-C₆H₁₃ | NCS | H | H | F | H | |
| H | NCS | F | H | F | H | |
| CH₃ | NCS | F | H | F | H | |
| C₂H₅ | NCS | F | H | F | H | |
| n-C₃H₇ | NCS | F | H | F | H | |
| n-C₄H₉ | NCS | F | H | F | H | |
| n-C₅H₁₁ | NCS | F | H | F | H | |
| n-C₆H₁₃ | NCS | F | H | F | H | |
| H | NCS | F | F | F | H | |
| CH₃ | NCS | F | F | F | H | |
| C₂H₅ | NCS | F | F | F | H | |
| n-C₃H₇ | NCS | F | F | F | H | |
| n-C₄H₉ | NCS | F | F | F | H | |
| n-C₅H₁₁ | NCS | F | F | F | H | |
| n-C₆H₁₃ | NCS | F | F | F | H | |
| n-C₆H₁₃ | C₃H₇ | F | F | F | H | |
| H | SF₅ | H | H | F | H | |
| CH₃ | SF₅ | H | H | F | H | |
| C₂H₅ | SF₅ | H | H | F | H | |
| n-C₃H₇ | SF₅ | H | H | F | H | |
| n-C₄H₉ | SF₅ | H | H | F | H | |
| n-C₅H₁₁ | SF₅ | H | H | F | H | |
| n-C₆H₁₃ | SF₅ | H | H | F | H | |
| H | SF₅ | F | H | F | H | |
| CH₃ | SF₅ | F | H | F | H | |
| C₂H₅ | SF₅ | F | H | F | H | |
| n-C₃H₇ | SF₅ | F | H | F | H | |
| n-C₄H₉ | SF₅ | F | H | F | H | |
| n-C₅H₁₁ | SF₅ | F | H | F | H | |
| n-C₆H₁₃ | SF₅ | F | H | F | H | |
| H | SF₅ | F | F | F | H | |
| CH₃ | SF₅ | F | F | F | H | |
| C₂H₅ | SF₅ | F | F | F | H | |
| n-C₃H₇ | SF₅ | F | F | F | H | |
| n-C₄H₉ | SF₅ | F | F | F | H | |
| n-C₅H₁₁ | SF₅ | F | F | F | H | |
| n-C₆H₁₃ | SF₅ | F | F | F | H | |
| H | CN | H | H | F | H | |
| CH₃ | CN | H | H | F | H | |
| C₂H₅ | CN | H | H | F | H | |
| n-C₃H₇ | CN | H | H | F | H | |
| n-C₄H₉ | CN | H | H | F | H | |
| n-C₅H₁₁ | CN | H | H | F | H | |
| n-C₆H₁₃ | CN | H | H | F | H | |
| H | CN | F | H | F | H | |
| CH₃ | CN | F | H | F | H | |
| C₂H₅ | CN | F | H | F | H | |
| n-C₃H₇ | CN | F | H | F | H | |
| n-C₄H₉ | CN | F | H | F | H | |
| n-C₅H₁₁ | CN | F | H | F | H | |
| n-C₆H₁₃ | CN | F | H | F | H | |
| H | CN | F | F | F | H | |
| CH₃ | CN | F | F | F | H | |
| C₂H₅ | CN | F | F | F | H | |
| n-C₃H₇ | CN | F | F | F | H | |
| n-C₄H₉ | CN | F | F | F | H | |
| n-C₅H₁₁ | CN | F | F | F | H | |
| n-C₆H₁₃ | CN | F | F | F | H | |
| H | F | H | H | F | F | |
| CH₃ | F | H | H | F | F | |
| C₂H₅ | F | H | H | F | F | |
| n-C₄H₉ | F | H | H | F | F | |
| n-C₅H₁₁ | F | H | H | F | F | |
| n-C₆H₁₃ | F | H | H | F | F | |
| H | F | F | H | F | F | |
| CH₃ | F | F | H | F | F | |
| C₂H₅ | F | F | H | F | F | |
| n-C₃H₇ | F | F | H | F | F | |
| n-C₄H₉ | F | F | H | F | F | |
| n-C₅H₁₁ | F | F | H | F | F | |
| n-C₆H₁₃ | F | F | H | F | F | |
| H | F | F | F | F | F | |
| CH₃ | F | F | F | F | F | |
| —CH=CH₂ | F | F | F | F | F | |
| C₂H₅ | F | F | F | F | F | Δε 19; Δn 0.080; γ₁ 58 mPa·s cf. Example 4 |
| n-C₃H₇ | F | F | F | F | F | |
| n-C₄H₉ | F | F | F | F | F | Δε 20; Δn 0.082; γ₁ 76 mPa·s |
| n-C₅H₁₁ | F | F | F | F | F | Δε 19; Δn 0.085; γ₁ 115 mPa·s |
| n-C₆H₁₃ | F | F | F | F | F | |
| n-C₇H₁₅ | F | F | F | F | F | |
| H | OCF₃ | H | H | F | F | |
| CH₃ | OCF₃ | H | H | F | F | |
| C₂H₅ | OCF₃ | H | H | F | F | |
| n-C₄H₉ | OCF₃ | H | H | F | F | |
| n-C₅H₁₁ | OCF₃ | H | H | F | F | |
| n-C₆H₁₃ | OCF₃ | H | H | F | F | |
| H | OCF₃ | F | H | F | F | |
| CH₃ | OCF₃ | F | H | F | F | |
| C₂H₅ | OCF₃ | F | H | F | F | |
| n-C₃H₇ | OCF₃ | F | H | F | F | |
| n-C₄H₉ | OCF₃ | F | H | F | F | |
| n-C₅H₁₁ | OCF₃ | F | H | F | F | |
| n-C₆H₁₃ | OCF₃ | F | H | F | F | |
| H | OCF₃ | F | F | F | F | |
| CH₃ | OCF₃ | F | F | F | F | |
| —CH=CH₂ | OCF₃ | F | F | F | F | |
| C₂H₅ | OCF₃ | F | F | F | F | |
| n-C₃H₇ | OCF₃ | F | F | F | F | |
| n-C₄H₉ | OCF₃ | F | F | F | F | |
| n-C₅H₁₁ | OCF₃ | F | F | F | F | |
| n-C₆H₁₃ | OCF₃ | F | F | F | F | |
| n-C₇H₁₅ | OCF₃ | F | F | F | F | |
| H | Cl | H | H | F | F | |
| CH₃ | Cl | H | H | F | F | |
| C₂H₅ | Cl | H | H | F | F | |
| C₃H₇ | Cl | H | H | F | F | C 49 N (44) I; Δε 13; Δn 0.140; γ₁ 164 mPa·s |
| n-C₄H₉ | Cl | H | H | F | F | |
| n-C₅H₁₁ | Cl | H | H | F | F | |
| n-C₆H₁₃ | Cl | H | H | F | F | |
| H | Cl | F | H | F | F | |
| CH₃ | Cl | F | H | F | F | |
| C₂H₅ | Cl | F | H | F | F | |
| n-C₃H₇ | Cl | F | H | F | F | C 38 N (23) I; Δε 16; Δn 0.128; γ₁ 141 mPa·s |
| n-C₄H₉ | Cl | F | H | F | F | |
| n-C₅H₁₁ | Cl | F | H | F | F | |
| n-C₆H₁₃ | Cl | F | H | F | F | |
| H | Cl | F | F | F | F | |
| CH₃ | Cl | F | F | F | F | |
| C₂H₅ | Cl | F | F | F | F | |
| n-C₃H₇ | Cl | F | F | F | F | |
| n-C₄H₉ | Cl | F | F | F | F | |
| n-C₅H₁₁ | Cl | F | F | F | F | |

| R¹ | X | L¹ | L² | L³ | L⁴ | Values |
|---|---|---|---|---|---|---|
| n-C₆H₁₃ | Cl | F | F | F | F | |
| H | CN | H | H | F | F | |
| CH₃ | CN | H | H | F | F | |
| C₂H₅ | CN | H | H | F | F | |
| n-C₃H₇ | CN | H | H | F | F | |
| n-C₄H₉ | CN | H | H | F | F | |
| n-C₅H₁₁ | CN | H | H | F | F | |
| n-C₆H₁₃ | CN | H | H | F | F | |
| H | CN | F | H | F | F | |
| CH₃ | CN | F | H | F | F | |
| C₂H₅ | CN | F | H | F | F | |
| n-C₃H₇ | CN | F | H | F | F | |
| n-C₄H₉ | CN | F | H | F | F | |
| n-C₅H₁₁ | CN | F | H | F | F | |
| n-C₆H₁₃ | CN | F | H | F | F | |
| H | CN | F | F | F | F | |
| CH₃ | CN | F | F | F | F | |
| C₂H₅ | CN | F | F | F | F | |
| n-C₃H₇ | CN | F | F | F | F | |
| n-C₄H₉ | CN | F | F | F | F | |
| n-C₅H₁₁ | CN | F | F | F | F | |
| n-C₆H₁₃ | CN | F | F | F | F | |
| n-C₇H₁₅ | CN | F | F | F | F | |

Compounds where $L^3=L^4=H$ are preferably prepared in accordance with Example 5:

EXAMPLE 5

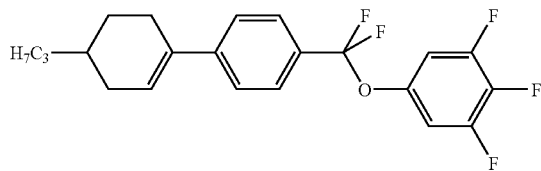

Step 5.1

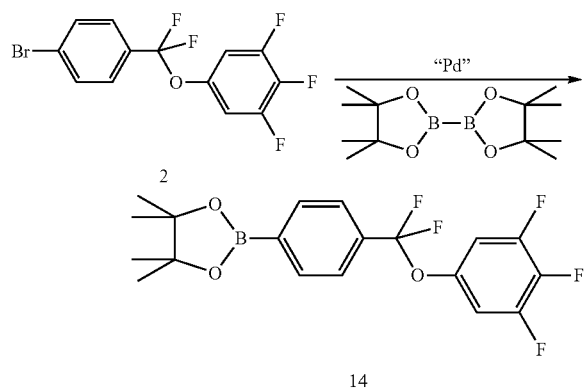

Under nitrogen, 15.0 g (40 mmol) of the bromide 2 are dissolved in 110 ml of dioxane, and 16.2 g (60 mmol) of bis(pinacolato)diboron are added. 12.5 g (130 mmol) of potassium acetate and 950 mg of PdCl₂-dppf (dppf: 1,1'-bis (diphenylphosphanyl)ferrocene) are subsequently added. The batch is stirred at 100° C. for 4 h. The cooled batch is diluted with 100 ml of MTB ether, and 70 ml of water are added. The aqueous phase is extracted with MTB ether. The combined organic phases are washed with water and saturated sodium chloride solution, dried and evaporated. The residue is crystallised from ethanol at −30° C.

Step 5.2

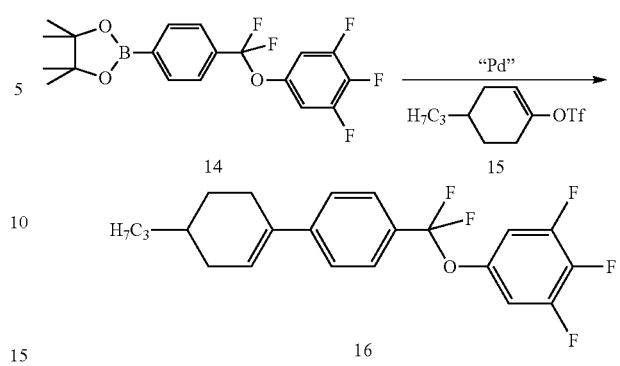

14.5 g of sodium metaborate octahydrate in 20 ml of water are initially introduced, and 490 mg of bis(triphenylphosphine)palladium(II) chloride, 30 ml of THF and hydrazinium hydroxide are added. After 5 min, 9.6 g (30 mmol) of the triflate 15 and 14.0 g of the boronic ester 14 are added to the batch. After 15 h at 70° C., the batch is diluted with water. The aqueous phase is extracted with MTB ether. The combined organic phases are evaporated. The residue is filtered through silica gel (n-heptane) and subsequently crystallised from ethanol and from n-heptane.

C 62 N (24) I
Δε 15
Δn 0.122
γ₁ 79 mPa·s

The following compounds of the formula

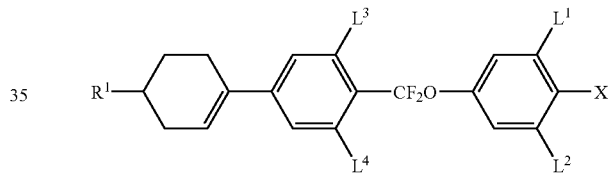

where $L^3$, $L^4$=H are prepared analogously to Example 5:

| R¹ | X | L¹ | L² | L³ | L⁴ | Values |
|---|---|---|---|---|---|---|
| H | F | H | H | H | H | |
| CH₃ | F | H | H | H | H | |
| C₂H₅ | F | H | H | H | H | |
| C₃H₇ | F | H | H | H | H | |
| n-C₄H₉ | F | H | H | H | H | |
| n-C₅H₁₁ | F | H | H | H | H | |
| n-C₆H₁₃ | F | H | H | H | H | |
| H | F | F | H | H | H | |
| CH₃ | F | F | H | H | H | |
| C₂H₅ | F | F | H | H | H | |
| n-C₃H₇ | F | F | H | H | H | |
| n-C₄H₉ | F | F | H | H | H | |
| n-C₅H₁₁ | F | F | H | H | H | |
| n-C₆H₁₃ | F | F | H | H | H | |
| H | F | F | F | H | H | |
| CH₃ | F | F | F | H | H | |
| C₂H₅ | F | F | F | H | H | |
| n-C₃H₇ | F | F | F | H | H | cf. Example 5 |
| n-C₄H₉ | F | F | F | H | H | |
| n-C₅H₁₁ | F | F | F | H | H | |
| n-C₆H₁₃ | F | F | F | H | H | |
| H | OCF₃ | H | H | H | H | |
| CH₃ | OCF₃ | H | H | H | H | |
| C₂H₅ | OCF₃ | H | H | H | H | |
| n-C₃H₇ | OCF₃ | H | H | H | H | |
| n-C₄H₉ | OCF₃ | H | H | H | H | |
| n-C₅H₁₁ | OCF₃ | H | H | H | H | |
| n-C₆H₁₃ | OCF₃ | H | H | H | H | |

-continued

| R¹ | X | L¹ | L² | L³ | L⁴ | Values |
|---|---|---|---|---|---|---|
| H | OCF₃ | F | H | H | H | |
| CH₃ | OCF₃ | F | H | H | H | |
| C₂H₅ | OCF₃ | F | H | H | H | |
| n-C₃H₇ | OCF₃ | F | H | H | H | |
| n-C₄H₉ | OCF₃ | F | H | H | H | |
| n-C₅H₁₁ | OCF₃ | F | H | H | H | |
| n-C₆H₁₃ | OCF₃ | F | H | H | H | |
| H | OCF₃ | F | F | H | H | |
| CH₃ | OCF₃ | F | F | H | H | |
| C₂H₅ | OCF₃ | F | F | H | H | |
| n-C₃H₇ | OCF₃ | F | F | H | H | |
| n-C₄H₉ | OCF₃ | F | F | H | H | |
| n-C₅H₁₁ | OCF₃ | F | F | H | H | |
| n-C₆H₁₃ | OCF₃ | F | F | H | H | |
| H | CN | H | H | H | H | |
| CH₃ | CN | H | H | H | H | |
| C₂H₅ | CN | H | H | H | H | |
| n-C₃H₇ | CN | H | H | H | H | |
| n-C₄H₉ | CN | H | H | H | H | |
| n-C₅H₁₁ | CN | H | H | H | H | |
| n-C₆H₁₃ | CN | H | H | H | H | |
| H | CN | F | H | H | H | |
| CH₃ | CN | F | H | H | H | |
| C₂H₅ | CN | F | H | H | H | |
| n-C₃H₇ | CN | F | H | H | H | |
| n-C₄H₉ | CN | F | H | H | H | |
| n-C₅H₁₁ | CN | F | H | H | H | |
| n-C₆H₁₃ | CN | F | H | H | H | |
| H | CN | F | F | H | H | |
| CH₃ | CN | F | F | H | H | |
| C₂H₅ | CN | F | F | H | H | |
| n-C₃H₇ | CN | F | F | H | H | |
| n-C₄H₉ | CN | F | F | H | H | |
| n-C₅H₁₁ | CN | F | F | H | H | |
| n-C₆H₁₃ | CN | F | F | H | H | |

EXAMPLE 6

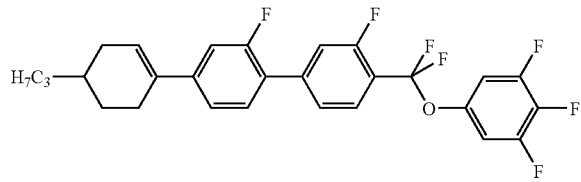

Step 6.1

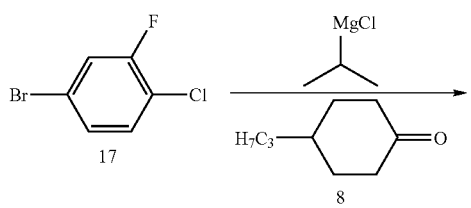

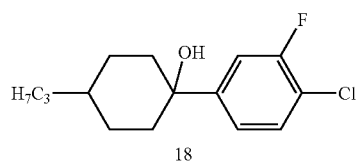

18

The reaction is carried out analogously to Example 4, step 4.1.

Step 6.2

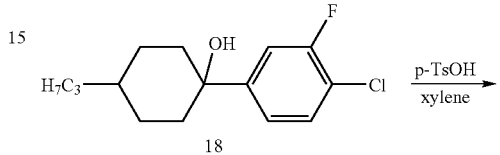

19

The reaction and purification are carried out analogously to step 1.2.

Step 6.3

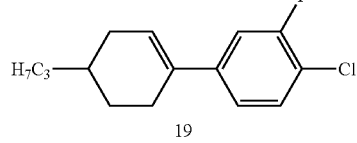

21

The boronic acid is prepared as second starting material for the subsequent step analogously to compound 14 from Example 5, step 5.1.

Step 6.4

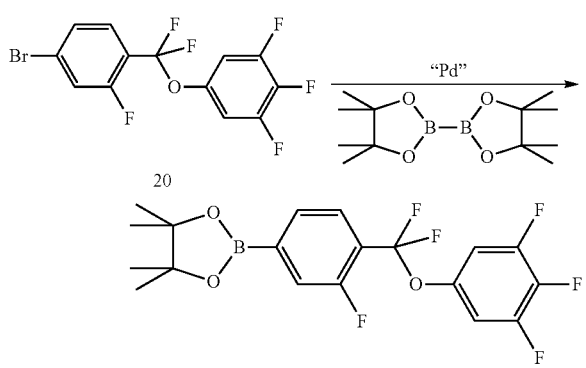

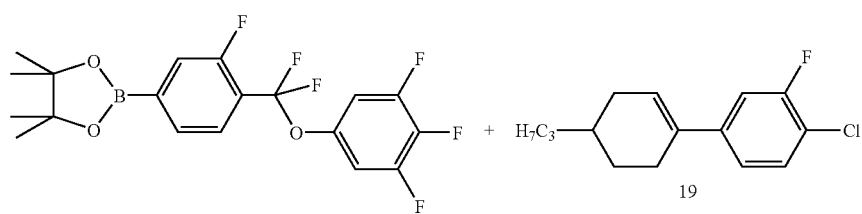

21                                19

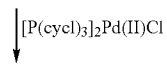
[P(cycl)₃]₂Pd(II)Cl

-continued

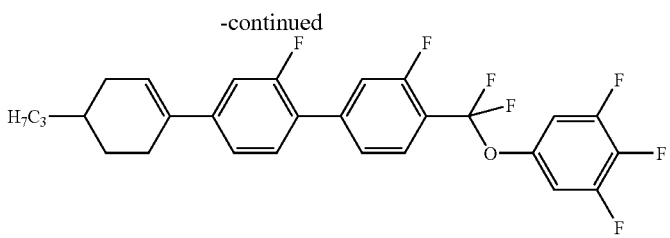

22

The reaction and purification are carried out using bis(tricyclohexylphosphine)palladium(II) chloride, aqueous base (Na$_2$CO$_3$) in the water/toluene two-phase system as described, for example, in the publication IDE 4340490 A1. The work-up and purification are carried out analogously to step 5.2.

C 65 SmA (63) N 145 I
Δε 24
Δn 0.190

The following compounds of the formula

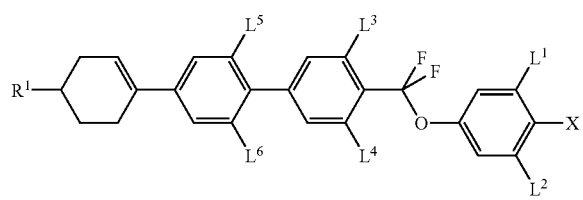

are prepared analogously to Example 6:

| R$^1$ | X | L$^1$ | L$^2$ | L$^3$ | L$^4$ | L$^5$ | L$^6$ | Values |
|---|---|---|---|---|---|---|---|---|
| H | F | H | H | H | H | H | H | |
| CH$_3$ | F | H | H | H | H | H | H | |
| C$_2$H$_5$ | F | H | H | H | H | H | H | |
| C$_3$H$_7$ | F | H | H | H | H | H | H | |
| n-C$_4$H$_9$ | F | H | H | H | H | H | H | |
| n-C$_5$H$_{11}$ | F | H | H | H | H | H | H | |
| n-C$_6$H$_{13}$ | F | H | H | H | H | H | H | |
| H | F | F | H | H | H | H | H | |
| CH$_3$ | F | F | H | H | H | H | H | |
| C$_2$H$_5$ | F | F | H | H | H | H | H | |
| n-C$_3$H$_7$ | F | F | H | H | H | H | H | |
| n-C$_4$H$_9$ | F | F | H | H | H | H | H | |
| n-C$_5$H$_{11}$ | F | F | H | H | H | H | H | |
| n-C$_6$H$_{13}$ | F | F | H | H | H | H | H | |
| H | F | F | F | H | H | H | H | |
| CH$_3$ | F | F | F | H | H | H | H | |
| C$_2$H$_5$ | F | F | F | H | H | H | H | |
| n-C$_3$H$_7$ | F | F | F | H | H | H | H | C 105 SmE 129 SmC' 134 SmC 150 SmA 169 N 193 I; Δε 19; Δn 0.211 |
| n-C$_4$H$_9$ | F | F | F | H | H | H | H | |
| n-C$_5$H$_{11}$ | F | F | F | H | H | H | H | |
| n-C$_6$H$_{13}$ | F | F | F | H | H | H | H | |
| H | F | H | H | F | H | H | H | |
| CH$_3$ | F | H | H | F | H | H | H | |
| C$_2$H$_5$ | F | H | H | F | H | H | H | |
| C$_3$H$_7$ | F | H | H | F | H | H | H | |
| n-C$_4$H$_9$ | F | H | H | F | H | H | H | |
| n-C$_5$H$_{11}$ | F | H | H | F | H | H | H | |
| n-C$_6$H$_{13}$ | F | H | H | F | H | H | H | |
| H | F | F | H | F | H | H | H | |
| CH$_3$ | F | F | H | F | H | H | H | |
| C$_2$H$_5$ | F | F | H | F | H | H | H | |
| n-C$_3$H$_7$ | F | F | H | F | H | H | H | |
| n-C$_4$H$_9$ | F | F | H | F | H | H | H | |
| n-C$_5$H$_{11}$ | F | F | H | F | H | H | H | |
| n-C$_6$H$_{13}$ | F | F | H | F | H | H | H | |
| H | F | F | F | F | H | H | H | |
| CH$_3$ | F | F | F | F | H | H | H | |
| C$_2$H$_5$ | F | F | F | F | H | H | H | |
| n-C$_3$H$_7$ | F | F | F | F | H | H | H | |
| n-C$_4$H$_9$ | F | F | F | F | H | H | H | |
| n-C$_5$H$_{11}$ | F | F | F | F | H | H | H | |
| n-C$_6$H$_{13}$ | F | F | F | F | H | H | H | |
| H | F | H | H | H | F | H | H | |
| CH$_3$ | F | H | H | H | F | H | H | |
| C$_2$H$_5$ | F | H | H | H | F | H | H | |
| C$_3$H$_7$ | F | H | H | H | F | H | H | |
| n-C$_4$H$_9$ | F | H | H | H | F | H | H | |
| n-C$_5$H$_{11}$ | F | H | H | H | F | H | H | |
| n-C$_6$H$_{13}$ | F | H | H | H | F | H | H | |
| H | F | F | H | H | F | H | H | |
| CH$_3$ | F | F | H | H | F | H | H | |
| C$_2$H$_5$ | F | F | H | H | F | H | H | |
| n-C$_3$H$_7$ | F | F | H | H | F | H | H | C 104 N 140 I; Δε 25; Δn 0.197 |
| n-C$_4$H$_9$ | F | F | H | H | F | H | H | |
| n-C$_5$H$_{11}$ | F | F | H | H | F | H | H | |
| n-C$_6$H$_{13}$ | F | F | H | H | F | H | H | |
| H | F | H | H | H | F | H | H | |
| CH$_3$ | F | H | H | H | F | H | H | |
| C$_2$H$_5$ | F | H | H | H | F | H | H | |
| C$_3$H$_7$ | F | H | H | H | F | H | H | |
| n-C$_4$H$_9$ | F | H | H | H | F | H | H | |
| n-C$_5$H$_{11}$ | F | H | H | H | F | H | H | |
| n-C$_6$H$_{13}$ | F | H | H | H | F | H | H | |
| H | F | F | H | H | F | H | H | |
| CH$_3$ | F | F | H | H | F | H | H | |
| C$_2$H$_5$ | F | F | H | H | F | H | H | |
| n-C$_3$H$_7$ | F | F | H | H | F | H | H | C 78 SmA 109 N 161 I; Δε 22; Δn 0.203 |
| n-C$_4$H$_9$ | F | F | H | H | F | H | H | |
| n-C$_5$H$_{11}$ | F | F | H | H | F | H | H | |
| n-C$_6$H$_{13}$ | F | F | H | H | F | H | H | |
| H | F | H | H | F | H | F | H | |
| CH$_3$ | F | H | H | F | H | F | H | |
| C$_2$H$_5$ | F | H | H | F | H | F | H | |
| C$_3$H$_7$ | F | H | H | F | H | F | H | |
| n-C$_4$H$_9$ | F | H | H | F | H | F | H | |
| n-C$_5$H$_{11}$ | F | H | H | F | H | F | H | |
| n-C$_6$H$_{13}$ | F | H | H | F | H | F | H | |
| H | F | F | F | H | F | H | | |

-continued

| R¹ | X | L¹ | L² | L³ | L⁴ | L⁵ | L⁶ | Values |
|---|---|---|---|---|---|---|---|---|
| CH₃ | F | F | H | F | H | F | H | |
| C₂H₅ | F | F | H | F | H | F | H | |
| n-C₃H₇ | F | F | H | F | H | F | H | |
| n-C₄H₉ | F | F | H | F | H | F | H | |
| n-C₅H₁₁ | F | F | H | F | H | F | H | |
| n-C₆H₁₃ | F | F | H | F | H | F | H | |
| H | F | F | F | F | H | F | H | |
| CH₃ | F | F | F | F | H | F | H | |
| C₂H₅ | F | F | F | F | H | F | H | |
| n-C₃H₇ | F | F | F | F | H | F | H | cf. Example 6 |
| n-C₄H₉ | F | F | F | F | H | F | H | |
| n-C₅H₁₁ | F | F | F | F | H | F | H | |
| n-C₆H₁₃ | F | F | F | F | H | F | H | |
| H | F | H | H | F | F | F | H | |
| CH₃ | F | H | H | F | F | F | H | |
| C₂H₅ | F | H | H | F | F | F | H | |
| C₃H₇ | F | H | H | F | F | F | H | |
| n-C₄H₉ | F | H | H | F | F | F | H | |
| n-C₅H₁₁ | F | H | H | F | F | F | H | |
| n-C₆H₁₃ | F | H | H | F | F | F | H | |
| H | F | F | H | F | F | F | H | |
| CH₃ | F | F | H | F | F | F | H | |
| C₂H₅ | F | F | H | F | F | F | H | |
| n-C₃H₇ | F | F | H | F | F | F | H | |
| n-C₄H₉ | F | F | H | F | F | F | H | |
| n-C₅H₁₁ | F | F | H | F | F | F | H | |
| n-C₆H₁₃ | F | F | H | F | F | F | H | |
| H | F | F | F | F | F | F | H | |
| CH₃ | F | F | F | F | F | F | H | |
| C₂H₅ | F | F | F | F | F | F | H | |
| n-C₃H₇ | F | F | F | F | F | F | H | C 84 N 127 I; Δε 29; Δn 0.183 |
| n-C₄H₉ | F | F | F | F | F | F | H | |
| n-C₅H₁₁ | F | F | F | F | F | F | H | |
| n-C₆H₁₃ | F | F | F | F | F | F | H | |
| H | F | H | H | H | H | F | F | |
| CH₃ | F | H | H | H | H | F | F | |
| C₂H₅ | F | H | H | H | H | F | F | |
| C₃H₇ | F | H | H | H | H | F | F | |
| n-C₄H₉ | F | H | H | H | H | F | F | |
| n-C₅H₁₁ | F | H | H | H | H | F | F | |
| n-C₆H₁₃ | F | H | H | H | H | F | F | |
| H | F | F | H | H | H | F | F | |
| CH₃ | F | F | H | H | H | F | F | |
| C₂H₅ | F | F | H | H | H | F | F | |
| n-C₃H₇ | F | F | H | H | H | F | F | |
| n-C₄H₉ | F | F | H | H | H | F | F | |
| n-C₅H₁₁ | F | F | H | H | H | F | F | |
| n-C₆H₁₃ | F | F | H | H | H | F | F | |
| H | F | F | F | H | H | F | F | |
| CH₃ | F | F | F | H | H | F | F | |
| C₂H₅ | F | F | F | H | H | F | F | |
| n-C₃H₇ | F | F | F | H | H | F | F | C 108 N 140 I; Δε 26; Δn 0.187 |
| n-C₄H₉ | F | F | F | H | H | F | F | |
| n-C₅H₁₁ | F | F | F | H | H | F | F | |
| n-C₆H₁₃ | F | F | F | H | H | F | F | |
| H | F | H | H | F | H | F | F | |
| CH₃ | F | H | H | F | H | F | F | |
| C₂H₅ | F | H | H | F | H | F | F | |
| C₃H₇ | F | H | H | F | H | F | F | |
| n-C₄H₉ | F | H | H | F | H | F | F | |
| n-C₅H₁₁ | F | H | H | F | H | F | F | |
| n-C₆H₁₃ | F | H | H | F | H | F | F | |
| H | F | F | H | F | H | F | F | |
| CH₃ | F | F | H | F | H | F | F | |
| C₂H₅ | F | F | H | F | H | F | F | |
| n-C₃H₇ | F | F | H | F | H | F | F | |
| n-C₄H₉ | F | F | H | F | H | F | F | |
| n-C₅H₁₁ | F | F | H | F | H | F | F | |
| n-C₆H₁₃ | F | F | H | F | H | F | F | |
| H | F | F | F | F | H | F | F | |
| CH₃ | F | F | F | F | H | F | F | |
| C₂H₅ | F | F | F | F | H | F | F | |
| n-C₃H₇ | F | F | F | F | H | F | F | C 83 N 125 I; Δε 29; Δn 0.177 |
| n-C₄H₉ | F | F | F | F | H | F | F | |
| n-C₅H₁₁ | F | F | F | F | H | F | F | |
| n-C₆H₁₃ | F | F | F | F | H | F | F | |
| H | F | H | H | F | F | F | F | |
| CH₃ | F | H | H | F | F | F | F | |
| C₂H₅ | F | H | H | F | F | F | F | |
| C₃H₇ | F | H | H | F | F | F | F | |
| n-C₄H₉ | F | H | H | F | F | F | F | |
| n-C₅H₁₁ | F | H | H | F | F | F | F | |
| n-C₆H₁₃ | F | H | H | F | F | F | F | |
| H | F | F | H | F | F | F | F | |
| CH₃ | F | F | H | F | F | F | F | |
| C₂H₅ | F | F | H | F | F | F | F | |
| n-C₃H₇ | F | F | H | F | F | F | F | |
| n-C₄H₉ | F | F | H | F | F | F | F | |
| n-C₅H₁₁ | F | F | H | F | F | F | F | |
| n-C₆H₁₃ | F | F | H | F | F | F | F | |
| H | F | F | F | F | F | F | F | |
| CH₃ | F | F | F | F | F | F | F | |
| C₂H₅ | F | F | F | F | F | F | F | |
| n-C₃H₇ | F | F | F | F | F | F | F | C 84 N 109 I; Δε 33; Δn 0.168 |
| n-C₄H₉ | F | F | F | F | F | F | F | |
| n-C₅H₁₁ | F | F | F | F | F | F | F | |
| n-C₆H₁₃ | F | F | F | F | F | F | F | |
| H | OCF₃ | H | H | H | H | H | H | |
| CH₃ | OCF₃ | H | H | H | H | H | H | |
| C₂H₅ | OCF₃ | H | H | H | H | H | H | |
| C₃H₇ | OCF₃ | H | H | H | H | H | H | |
| n-C₄H₉ | OCF₃ | H | H | H | H | H | H | |
| n-C₅H₁₁ | OCF₃ | H | H | H | H | H | H | |
| n-C₆H₁₃ | OCF₃ | H | H | H | H | H | H | |
| H | OCF₃ | F | H | H | H | H | H | |
| CH₃ | OCF₃ | F | H | H | H | H | H | |
| C₂H₅ | OCF₃ | F | H | H | H | H | H | |
| n-C₃H₇ | OCF₃ | F | H | H | H | H | H | C 31 SmC' 120 SmC 139 SmA' 159 SmA 223 N 228 I; Δε 16; Δn 0.212 |
| n-C₄H₉ | OCF₃ | F | H | H | H | H | H | |
| n-C₅H₁₁ | OCF₃ | F | H | H | H | H | H | |
| n-C₆H₁₃ | OCF₃ | F | H | H | H | H | H | |
| H | OCF₃ | F | F | H | H | H | H | |
| CH₃ | OCF₃ | F | F | H | H | H | H | |
| C₂H₅ | OCF₃ | F | F | H | H | H | H | |
| n-C₃H₇ | OCF₃ | F | F | H | H | H | H | |
| n-C₄H₉ | OCF₃ | F | F | H | H | H | H | |
| n-C₅H₁₁ | OCF₃ | F | F | H | H | H | H | |
| n-C₆H₁₃ | OCF₃ | F | F | H | H | H | H | |
| H | OCF₃ | H | H | F | H | H | H | |
| CH₃ | OCF₃ | H | H | F | H | H | H | |
| C₂H₅ | OCF₃ | H | H | F | H | H | H | |
| C₃H₇ | OCF₃ | H | H | F | H | H | H | |
| n-C₄H₉ | OCF₃ | H | H | F | H | H | H | |
| n-C₅H₁₁ | OCF₃ | H | H | F | H | H | H | |
| n-C₆H₁₃ | OCF₃ | H | H | F | H | H | H | |
| H | OCF₃ | F | H | F | H | H | H | |
| CH₃ | OCF₃ | F | H | F | H | H | H | |
| C₂H₅ | OCF₃ | F | H | F | H | H | H | |
| n-C₃H₇ | OCF₃ | F | H | F | H | H | H | |
| n-C₄H₉ | OCF₃ | F | H | F | H | H | H | |
| n-C₅H₁₁ | OCF₃ | F | H | F | H | H | H | |
| n-C₆H₁₃ | OCF₃ | F | H | F | H | H | H | |
| H | OCF₃ | F | F | F | H | H | H | |
| CH₃ | OCF₃ | F | F | F | H | H | H | |
| C₂H₅ | OCF₃ | F | F | F | H | H | H | |
| C₃H₇ | OCF₃ | F | F | F | H | H | H | |
| n-C₄H₉ | OCF₃ | F | F | F | H | H | H | |
| n-C₅H₁₁ | OCF₃ | F | F | F | H | H | H | |
| n-C₆H₁₃ | OCF₃ | F | F | F | H | H | H | |
| H | OCF₃ | H | H | H | F | H | H | |
| CH₃ | OCF₃ | F | H | H | F | H | H | |
| C₂H₅ | OCF₃ | F | H | H | F | H | H | |
| n-C₃H₇ | OCF₃ | F | H | H | F | H | H | |

| R¹ | X | L¹ | L² | L³ | L⁴ | L⁵ | L⁶ | Values |
|---|---|---|---|---|---|---|---|---|
| n-C₄H₉ | OCF₃ | F | H | F | F | H | H | |
| n-C₅H₁₁ | OCF₃ | F | H | F | F | H | H | |
| n-C₆H₁₃ | OCF₃ | F | H | F | F | H | H | |
| H | OCF₃ | F | F | F | F | H | H | |
| CH₃ | OCF₃ | F | F | F | F | H | H | |
| C₂H₅ | OCF₃ | F | F | F | F | H | H | |
| n-C₃H₇ | OCF₃ | F | F | F | F | H | H | |
| n-C₄H₉ | OCF₃ | F | F | F | F | H | H | |
| n-C₅H₁₁ | OCF₃ | F | F | F | F | H | H | |
| n-C₆H₁₃ | OCF₃ | F | F | F | F | H | H | |
| H | OCF₃ | H | H | H | H | F | H | |
| CH₃ | OCF₃ | H | H | H | H | F | H | |
| C₂H₅ | OCF₃ | H | H | H | H | F | H | |
| C₃H₇ | OCF₃ | H | H | H | H | F | H | |
| n-C₄H₉ | OCF₃ | H | H | H | H | F | H | |
| n-C₅H₁₁ | OCF₃ | H | H | H | H | F | H | |
| n-C₆H₁₃ | OCF₃ | H | H | H | H | F | H | |
| H | OCF₃ | F | H | H | H | F | H | |
| CH₃ | OCF₃ | F | H | H | H | F | H | |
| C₂H₅ | OCF₃ | F | H | H | H | F | H | |
| n-C₃H₇ | OCF₃ | F | H | H | H | F | H | C 31 SmA 177 N 193 I; Δε 18; Δn 0.197 |
| n-C₄H₉ | OCF₃ | F | H | H | H | F | H | |
| n-C₅H₁₁ | OCF₃ | F | H | H | H | F | H | |
| n-C₆H₁₃ | OCF₃ | F | H | H | H | F | H | |
| H | OCF₃ | F | F | H | H | F | H | |
| CH₃ | OCF₃ | F | F | H | H | F | H | |
| C₂H₅ | OCF₃ | F | F | H | H | F | H | |
| n-C₃H₇ | OCF₃ | F | F | H | H | F | H | |
| n-C₄H₉ | OCF₃ | F | F | H | H | F | H | |
| n-C₅H₁₁ | OCF₃ | F | F | H | H | F | H | |
| n-C₆H₁₃ | OCF₃ | F | F | H | H | F | H | |
| H | OCF₃ | H | H | F | H | F | H | |
| CH₃ | OCF₃ | H | H | F | H | F | H | |
| C₂H₅ | OCF₃ | H | H | F | H | F | H | |
| C₃H₇ | OCF₃ | H | H | F | H | F | H | |
| n-C₄H₉ | OCF₃ | H | H | F | H | F | H | |
| n-C₅H₁₁ | OCF₃ | H | H | F | H | F | H | |
| n-C₆H₁₃ | OCF₃ | H | H | F | H | F | H | |
| H | OCF₃ | F | H | F | H | F | H | |
| CH₃ | OCF₃ | F | H | F | H | F | H | |
| C₂H₅ | OCF₃ | F | H | F | H | F | H | |
| n-C₃H₇ | OCF₃ | F | H | F | H | F | H | |
| n-C₄H₉ | OCF₃ | F | H | F | H | F | H | |
| n-C₅H₁₁ | OCF₃ | F | H | F | H | F | H | |
| n-C₆H₁₃ | OCF₃ | F | H | F | H | F | H | |
| H | OCF₃ | F | F | F | H | F | H | |
| CH₃ | OCF₃ | F | F | F | H | F | H | |
| C₂H₅ | OCF₃ | F | F | F | H | F | H | |
| n-C₃H₇ | OCF₃ | F | F | F | H | F | H | |
| n-C₄H₉ | OCF₃ | F | F | F | H | F | H | |
| n-C₅H₁₁ | OCF₃ | F | F | F | H | F | H | |
| n-C₆H₁₃ | OCF₃ | F | F | F | H | F | H | |
| H | OCF₃ | H | H | F | F | F | H | |
| CH₃ | OCF₃ | H | H | F | F | F | H | |
| C₂H₅ | OCF₃ | H | H | F | F | F | H | |
| C₃H₇ | OCF₃ | H | H | F | F | F | H | |
| n-C₄H₉ | OCF₃ | H | H | F | F | F | H | |
| n-C₅H₁₁ | OCF₃ | H | H | F | F | F | H | |
| n-C₆H₁₃ | OCF₃ | H | H | F | F | F | H | |
| H | OCF₃ | F | H | F | F | F | H | |
| CH₃ | OCF₃ | F | H | F | F | F | H | |
| C₂H₅ | OCF₃ | F | H | F | F | F | H | |
| n-C₃H₇ | OCF₃ | F | H | F | F | F | H | C 57 SmA 125 N 153 I; Δε 25; Δn 0.183 |
| n-C₄H₉ | OCF₃ | F | H | F | F | F | H | |
| n-C₅H₁₁ | OCF₃ | F | H | F | F | F | H | |
| n-C₆H₁₃ | OCF₃ | F | H | F | F | F | H | |
| H | OCF₃ | F | F | F | F | F | H | |
| CH₃ | OCF₃ | F | F | F | F | F | H | |
| C₂H₅ | OCF₃ | F | F | F | F | F | H | |
| n-C₃H₇ | OCF₃ | F | F | F | F | F | H | |
| n-C₄H₉ | OCF₃ | F | F | F | F | F | H | |
| n-C₅H₁₁ | OCF₃ | F | F | F | F | F | H | |
| n-C₆H₁₃ | OCF₃ | F | F | F | F | F | H | |
| H | OCF₃ | H | H | H | H | F | F | |
| CH₃ | OCF₃ | H | H | H | H | F | F | |
| C₂H₅ | OCF₃ | H | H | H | H | F | F | |
| C₃H₇ | OCF₃ | H | H | H | H | F | F | |
| n-C₄H₉ | OCF₃ | H | H | H | H | F | F | |
| n-C₅H₁₁ | OCF₃ | H | H | H | H | F | F | |
| n-C₆H₁₃ | OCF₃ | H | H | H | H | F | F | |
| H | OCF₃ | F | H | H | H | F | F | |
| CH₃ | OCF₃ | F | H | H | H | F | F | |
| C₂H₅ | OCF₃ | F | H | H | H | F | F | |
| n-C₃H₇ | OCF₃ | F | H | H | H | F | F | |
| n-C₄H₉ | OCF₃ | F | H | H | H | F | F | |
| n-C₅H₁₁ | OCF₃ | F | H | H | H | F | F | |
| n-C₆H₁₃ | OCF₃ | F | H | H | H | F | F | |
| H | OCF₃ | F | F | H | H | F | F | |
| CH₃ | OCF₃ | F | F | H | H | F | F | |
| C₂H₅ | OCF₃ | F | F | H | H | F | F | |
| n-C₃H₇ | OCF₃ | F | F | H | H | F | F | |
| n-C₄H₉ | OCF₃ | F | F | H | H | F | F | |
| n-C₅H₁₁ | OCF₃ | F | F | H | H | F | F | |
| n-C₆H₁₃ | OCF₃ | F | F | H | H | F | F | |
| H | OCF₃ | H | H | F | H | F | F | |
| CH₃ | OCF₃ | H | H | F | H | F | F | |
| C₂H₅ | OCF₃ | H | H | F | H | F | F | |
| C₃H₇ | OCF₃ | H | H | F | H | F | F | |
| n-C₄H₉ | OCF₃ | H | H | F | H | F | F | |
| n-C₅H₁₁ | OCF₃ | H | H | F | H | F | F | |
| n-C₆H₁₃ | OCF₃ | H | H | F | H | F | F | |
| H | OCF₃ | F | H | F | H | F | F | |
| CH₃ | OCF₃ | F | H | F | H | F | F | |
| C₂H₅ | OCF₃ | F | H | F | H | F | F | |
| n-C₃H₇ | OCF₃ | F | H | F | H | F | F | |
| n-C₄H₉ | OCF₃ | F | H | F | H | F | F | |
| n-C₅H₁₁ | OCF₃ | F | H | F | H | F | F | |
| n-C₆H₁₃ | OCF₃ | F | H | F | H | F | F | |
| H | OCF₃ | F | F | F | H | F | F | |
| CH₃ | OCF₃ | F | F | F | H | F | F | |
| C₂H₅ | OCF₃ | F | F | F | H | F | F | |
| n-C₃H₇ | OCF₃ | F | F | F | H | F | F | |
| n-C₄H₉ | OCF₃ | F | F | F | H | F | F | |
| n-C₅H₁₁ | OCF₃ | F | F | F | H | F | F | |
| n-C₆H₁₃ | OCF₃ | F | F | F | H | F | F | |
| H | OCF₃ | H | H | F | F | F | F | |
| CH₃ | OCF₃ | H | H | F | F | F | F | |
| C₂H₅ | OCF₃ | H | H | F | F | F | F | |
| C₃H₇ | OCF₃ | H | H | F | F | F | F | |
| n-C₄H₉ | OCF₃ | H | H | F | F | F | F | |
| n-C₅H₁₁ | OCF₃ | H | H | F | F | F | F | |
| n-C₆H₁₃ | OCF₃ | H | H | F | F | F | F | |
| H | OCF₃ | F | H | F | F | F | F | |
| CH₃ | OCF₃ | F | H | F | F | F | F | |
| C₂H₅ | OCF₃ | F | H | F | F | F | F | |
| n-C₃H₇ | OCF₃ | F | H | F | F | F | F | |
| n-C₄H₉ | OCF₃ | F | H | F | F | F | F | |
| n-C₅H₁₁ | OCF₃ | F | H | F | F | F | F | |
| n-C₆H₁₃ | OCF₃ | F | H | F | F | F | F | |
| H | OCF₃ | F | F | F | F | F | F | |
| CH₃ | OCF₃ | F | F | F | F | F | F | |
| C₂H₅ | OCF₃ | F | F | F | F | F | F | |
| n-C₃H₇ | OCF₃ | F | F | F | F | F | F | |
| n-C₄H₉ | OCF₃ | F | F | F | F | F | F | |
| n-C₅H₁₁ | OCF₃ | F | F | F | F | F | F | |
| n-C₆H₁₃ | OCF₃ | F | F | F | F | F | F | |

EXAMPLE 7

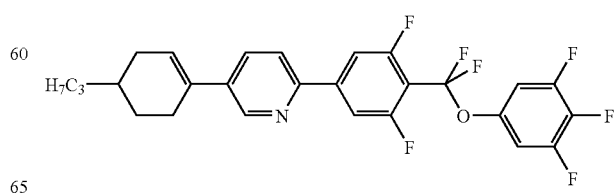

Step 7.1

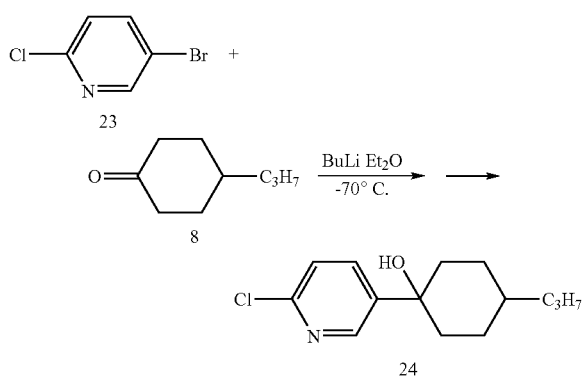

180 ml (290 mmol) of 15% BuLi in n-hexane are added at −70° C. under nitrogen to a solution of the pyridine (50.0 g; 260 mmol) in 400 ml of diethyl ether. After 60 min, a solution of 36.4 g (260 mmol) of the cyclohexyl ketone in 200 ml of diethyl ether is added to the batch, likewise at low temperature. After a further hour, the batch is warmed to −20° C. and added to ice-water. The organic phase is dried over sodium sulfate and evaporated. The residue obtained is employed in the subsequent step without further purification.

Step 7.2

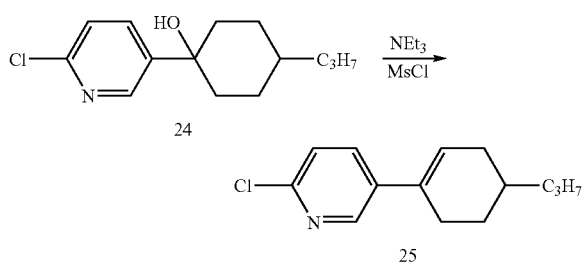

Under nitrogen, 66 g (260.0 mmol) of the alcohol derivative are dissolved in 800 ml of dichloromethane and 108 ml of triethylamine, and 26.2 ml (340 mmol) of methanesulfonyl chloride (MsCl) are added at 0° C. The batch is stirred overnight at RT. The reaction mixture is subsequently added to water and extracted with MTB ether. The organic phase is evaporated, and the residue obtained is passed over silica gel (MTB ether/n-heptane 1:4). The residue is employed in the subsequent step without further purification.

Step 7.3

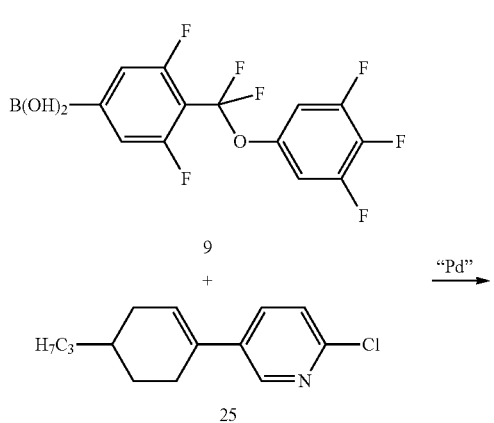

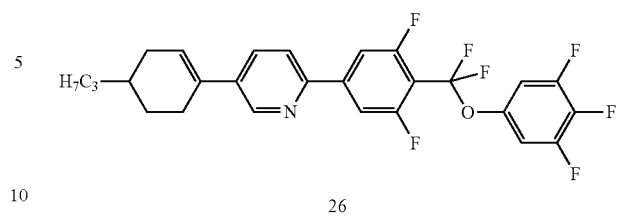

8.7 g (30 mmol) of sodium metaborate octahydrate are initially introduced in 15 ml of water, and 40 ml of THF, 0.10 ml of hydrazinium hydroxide and 300 mg of bis(triphenylphosphine)palladium(II) chloride are added, and the mixture is stirred at RT for 5 min. A solution of 21.5 g (35%; 20 mmol) of the boronic acid derivative and 4.7 g (20 mmol) of the pyridine chloride is subsequently added to the batch. After 15 h under reflux, the reaction mixture is extracted with MTB ether. The organic phase is evaporated. The residue is filtered through silica gel (n-heptane). The final purification of the product is carried out by crystallisation from heptane.

C 73 SmA (73) N 138 I

Δε 30

Δn 0.197

The following is prepared analogously:

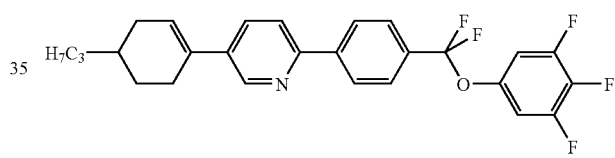

C 100 SmC 107 SmA 184 N 195 I

Δε 24

Δn 0.215

EXAMPLE 8

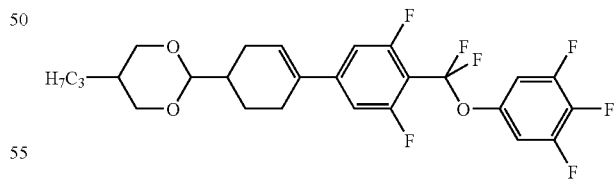

The corresponding dioxane compounds are prepared analogously to the compounds from Example 2.

C 84 N 121 I

Δε 34

Δn 0.123.

Further combinations of the embodiments and variants of the invention in accordance with the description arise from the following claims.

The invention claimed is:

1. A compound of formula I

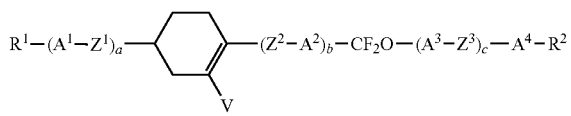

wherein
- $R^1$ is H, F, Cl, Br, a halogenated or unsubstituted alkyl radical having 1 to 15 C atoms, where one or more $CH_2$ groups in these radicals are each optionally replaced, independently of one another, by —C≡C—, —CH=CH—, or —O— in such a way that O atoms are not linked directly to one another,
- $R^2$ is F, Cl, $OCF_3$, $OCHF_2$, $OCHFCF_3$, $OCF_2CHFCF_3$, $CF_3$, CN, $SF_5$, or NCS,
- $A^1$ and $A^2$ are each, independently of one another, identically or differently:
  - a) trans-1,4-cyclohexylene or cyclohexenylene, in which, in addition, one or more non-adjacent $CH_2$ groups are each optionally replaced by —O— and/or —S—, and in which H atoms are optionally replaced by F,
  - b) 1,4-phenylene, in which one or two CH groups are each optionally replaced by N and in which, in addition, one or more H atoms are optionally replaced by Br, Cl, F, CN, methyl, methoxy, or a mono- or polyfluorinated methyl or methoxy group,
  or
  - c) 1,4-bicyclo[2.2.2]octylene, piperidine-1,4-diyl, cyclobutane-1,3-diyl, spiro[3.3]heptane-2,6-diyl,

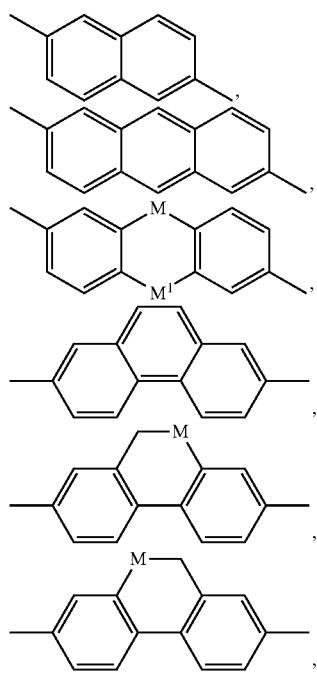

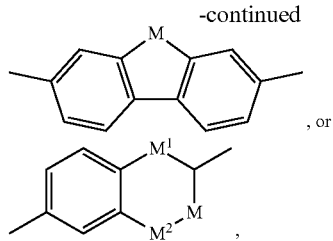

in which one or more hydrogen atoms are each optionally replaced by F, CN, SCN, $SF_5$, $CH_2F$, $CHF_2$, $CF_3$, $OCH_2F$, $OCHF_2$ or $OCF_3$, one or more double bonds are each optionally replaced by single bonds, $A^3$ and $A^4$ are each, independently of one another, identically or differently:
- b) 1,4-phenylene, in which one or two CH groups are each optionally replaced by N and in which, in addition, one or more H atoms are optionally replaced by Br, Cl, F, CN, methyl, methoxy, or a mono- or polyfluorinated methyl or methoxy group,
or
- c) 1,4-bicyclo[2.2.2]octylene, piperidine-1,4-diyl, cyclobutane-1,3-diyl, spiro[3.3]heptane-2,6-diyl,

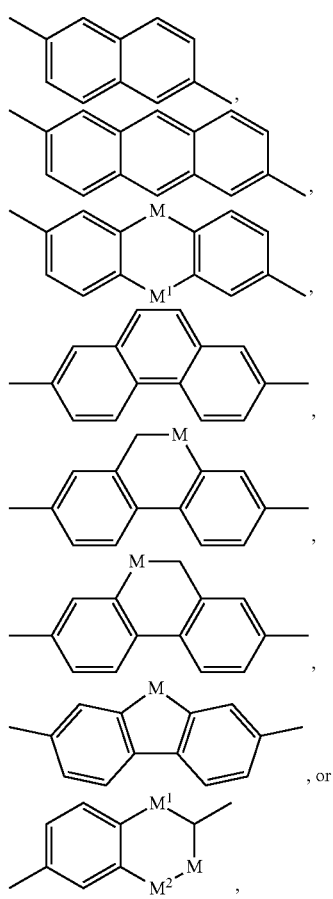

in which one or more hydrogen atoms are each optionally replaced by F, CN, SCN, $SF_5$, $CH_2F$, $CHF_2$, $CF_3$, $OCH_2F$, $OCHF_2$ or $OCF_3$, one or more double bonds are each optionally replaced by single bonds, M, $M^1$ or $M^2$ are each —O—, —S—, —CH$_2$—, —CHY— or —CYY$^1$— in such a way that adjacent groups are not simultaneously —O— or —S—, Y and $Y^1$ are each Cl, F, CN, OCF$_3$ or CF$_3$, V is H or F, $Z^1$, $Z^2$ and $Z^3$ are each, independently of one another, identically or differently, a single bond, —CH$_2$O—, —(CO)O—, —CF$_2$O—, —CH$_2$CH$_2$CF$_2$O—, —CF$_2$CF$_2$—, —CH$_2$CF$_2$—, —CH$_2$CH$_2$—, —(CH$_2$)$_4$—, —CH=CH—, —CH=CF—, —CF=CF— or —C≡C—, where asymmetrical bridges may be oriented to both sides, a is 0, 1 or 2, b is 1 or 2, and c is 0, 1 or 2, where a+b+c is ≦4.

2. A compound according to claim 1, wherein said compound is of formula IA

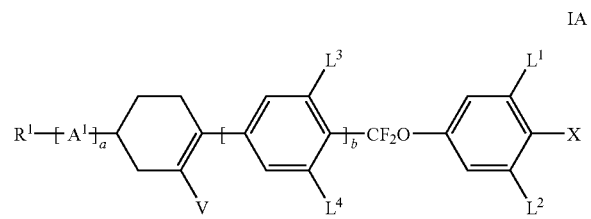

IA wherein $R^1$, $A^1$, a, and b are as defined in claim 1,

X is F, OCF$_3$, CN, CF$_3$, SF$_5$, NCS, Cl, OCHF$_2$, OCHFCF$_3$, OCF$_2$CHFCF$_3$,

V is H or F, and $L^1$, $L^2$, $L^3$ and $L^4$ are each, independently of one another, H or F.

3. A compound according to claim 1, wherein $R^1$ is alkyl, alkoxy, alkenyl or alkenyloxy, having up to 8 carbon atoms in each case.

4. A compound according to claim 1, wherein $L^1$ is fluorine and $L^2$ is fluorine or hydrogen.

5. A compound according to claim 1 of the formulae I1 to I5

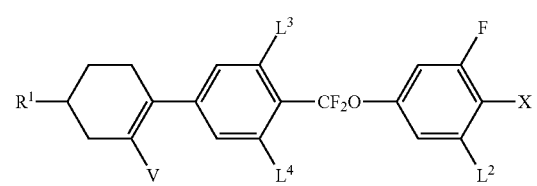

I1

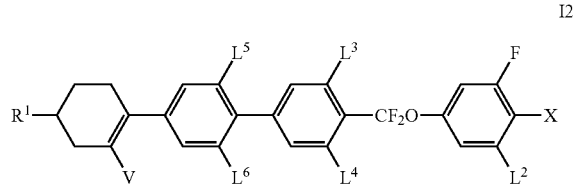

I2

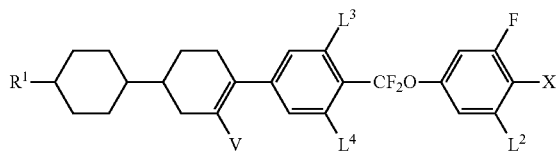

I3

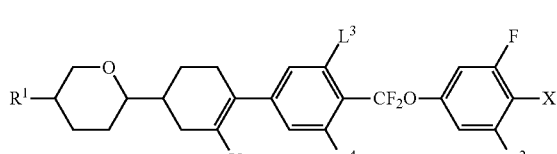

I4

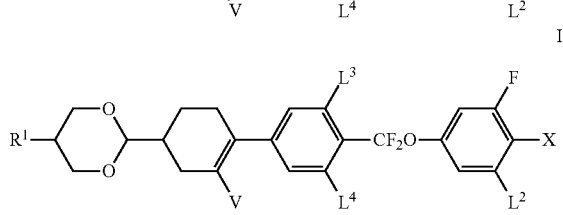

I5 wherein $R^1$ and V are as defined in claim 1,

X is F, OCF$_3$, CN, CF$_3$, SF$_5$, NCS, Cl, OCHF$_2$, OCHFCF$_3$, OCF$_2$CHFCF$_3$, and $L^2$, $L^3$, $L^4$, $L^5$ and $L^6$ are each H or F.

6. A compound according to claim 1, wherein $L^1$ and $L^2$ are each fluorine.

7. A compound according to claim 1, wherein V is hydrogen.

8. A compound according to claim 1, wherein V is fluorine.

9. A process for the preparation of a compound according to claim 1 in which V is hydrogen, said process comprising:

reacting a cyclohexane ketone of the formula

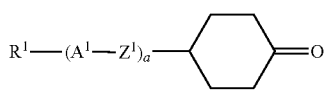

wherein $R^1$, $A^1$, $Z^1$, and a are as defined in claim 1, at the carbonyl group with an organomagnesium compound of the formula MgHal-($Z^2$-$A^2$)$_b$-CF$_2$O-($A^3$-$Z^3$)$_c$-$A^4$-$R^2$ wherein $R^2$, $A^2$, $A^3$, $A^4$, $Z^2$, $Z^3$, b, and c are as defined in claim 1, and Hal is Cl or Br.

10. A process for the preparation of a compound according to claim 1 in which V is fluorine or hydrogen, said process comprising:

reacting a cyclohexene of the formula

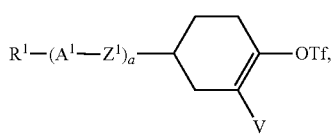

wherein $R^1$, $A^1$, $Z^1$, and a are as defined in claim 1, and

Tf is —(SO$_2$)CF$_3$, in the presence of a transition-metal catalyst, with a boronic acid or an open-chain or cyclic boronic acid ester of the formulae

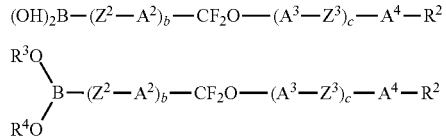

wherein $R^2, A^2, A^3, A^4, Z^2, Z^3$, b, and c are as defined in claim 1, and $R^3$, $R^4$ are each alkyl having 1-12 C atoms or $R^3+R^4$ together are an alkylene.

11. A liquid-crystalline medium comprising at least two mesogenic compounds, wherein said medium contains at least one compound according to claim 1.

12. A method of generating an electro-optical effect using a liquid-crystalline medium according to claim 11.

13. An electro-optical liquid-crystal display containing a liquid-crystalline medium according to claim 11.

14. A compound according to claim 1, wherein a is 0 or 1.

15. A compound according to claim 1, wherein a is 0 or 1, b is 1, and c is 0.

16. A compound according to claim 1, wherein a is 1.

17. A compound according to claim 1, wherein $Z^1$ and/or $Z^3$ are each a single bond, —$CF_2O$—, —$OCF_2$—, —$CF_2CF_2$—, —$CH_2O$—, —$OCH_2$—, or —(CO)O—, and $Z^2$ is —$CH_2CH_2$—, —CH=CH—, —C≡C—, or a single bond.

18. A compound according to claim 1, wherein $A^1$ and $A^2$ are each selected from:

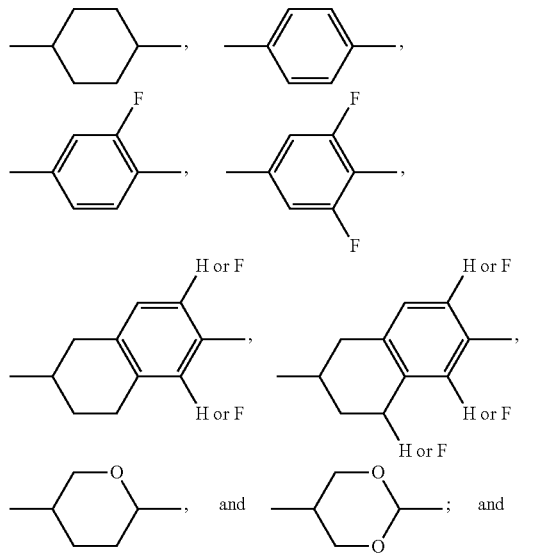

$A^3$ and $A^4$ are each selected from:

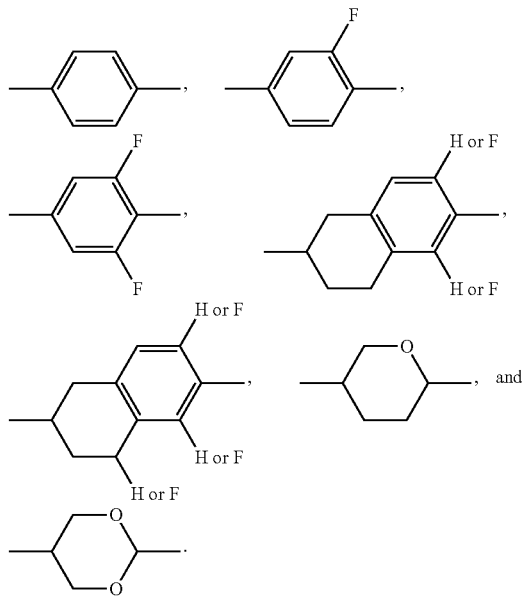

19. A compound according to claim 1, wherein $A^2$ is

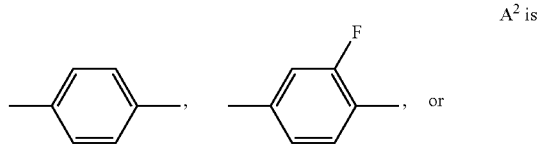

$A^4$ is

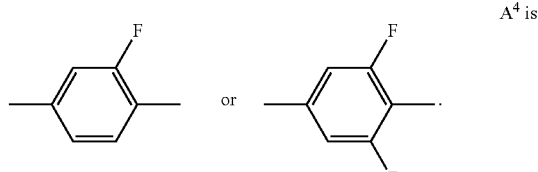

20. A compound according to claim 2, wherein $L^1$ is fluorine.

21. A compound according to claim 2, wherein b is 1.

22. A compound according to claim 2, wherein V is H.

23. A compound according to claim 2, wherein $L^3$ is fluorine.

24. A compound according to claim 2, wherein $L^1$ is fluorine, b is 1, V is H, and $L^3$ is fluorine.

* * * * *